(12) United States Patent
Okabe et al.

(10) Patent No.: US 8,106,998 B2
(45) Date of Patent: Jan. 31, 2012

(54) IMAGE PICKUP APPARATUS AND FOCUSING CONDITION DISPLAYING METHOD

(75) Inventors: Yuuki Okabe, Tokyo (JP); Takeshi Misawa, Miyagi (JP)

(73) Assignee: FujiFilm Corporation, Tokyo (JP)

( * ) Notice: Subject to any disclaimer, the term of this patent is extended or adjusted under 35 U.S.C. 154(b) by 550 days.

(21) Appl. No.: 12/196,090

(22) Filed: Aug. 21, 2008

(65) Prior Publication Data
US 2009/0059058 A1    Mar. 5, 2009

(30) Foreign Application Priority Data

Aug. 31, 2007  (JP) ................................. 2007-227110
Sep. 14, 2007  (JP) ................................. 2007-240012

(51) Int. Cl.
*H04N 5/232*  (2006.01)
*H04N 5/225*  (2006.01)

(52) U.S. Cl. ............... 348/346; 348/333.04; 348/333.11

(58) Field of Classification Search ............. 348/333.01, 348/333.02, 333.03, 333.04, 333.11, 346
See application file for complete search history.

(56) References Cited

U.S. PATENT DOCUMENTS

| | | | | |
|---|---|---|---|---|
| 6,359,650 B1* | 3/2002 | Murakami | ............... | 348/333.04 |
| 6,750,914 B2 | 6/2004 | Sannoh et al. | | |
| 2002/0149689 A1* | 10/2002 | Sannoh et al. | ........... | 348/333.04 |
| 2003/0071908 A1 | 4/2003 | Sannoh et al. | | |
| 2003/0156216 A1* | 8/2003 | Nonaka | ......................... | 348/345 |
| 2006/0044452 A1* | 3/2006 | Hagino | ......................... | 348/345 |
| 2006/0055814 A1* | 3/2006 | Okawa et al. | ........... | 348/333.02 |
| 2006/0092306 A1* | 5/2006 | Kim | ........................ | 348/333.01 |
| 2006/0182433 A1 | 8/2006 | Kawahara et al. | | |
| 2006/0210264 A1* | 9/2006 | Saga | .............................. | 396/287 |
| 2007/0009251 A1* | 1/2007 | Koskinen | ...................... | 396/147 |
| 2007/0177036 A1* | 8/2007 | Kawada | ........................ | 348/239 |
| 2007/0263909 A1 | 11/2007 | Ojima et al. | | |
| 2007/0263933 A1 | 11/2007 | Ojima et al. | | |
| 2007/0263934 A1 | 11/2007 | Ojima et al. | | |
| 2007/0263935 A1 | 11/2007 | Sanno et al. | | |
| 2007/0268370 A1 | 11/2007 | Sanno et al. | | |
| 2008/0204564 A1* | 8/2008 | Yumiki | ..................... | 348/222.1 |
| 2009/0135269 A1 | 5/2009 | Nozaki et al. | | |
| 2009/0147107 A1 | 6/2009 | Kawahara et al. | | |
| 2011/0115940 A1 | 5/2011 | Ojima et al. | | |

FOREIGN PATENT DOCUMENTS

| | | |
|---|---|---|
| EP | 1 250 002 A1 | 10/2002 |
| EP | 1648166 A2 | 4/2006 |
| JP | 6-113184 A | 4/1994 |
| JP | 6-301098 A | 10/1994 |

(Continued)

*Primary Examiner* — Jason Whipkey
(74) *Attorney, Agent, or Firm* — Birch, Stewart, Kolasch & Birch, LLP

(57) ABSTRACT

In an image pickup apparatus of the present invention, an image of an object is picked up and an image signal representing the object is continuously captured so that a through-the-lens image is displayed based on the captured image signal, and then a display area for displaying focusing information is composited into the through-the-lens image of a displaying device. In addition, based on the captured image signal, an automatic focus adjustment is performed to maximize the contrast of the object, and the result of the focus adjustment is detected. Based on the detected focusing condition, focusing information which is composited into the display area is changed. The focusing information includes at least focusing information of an unfocused condition and focusing information of a focused condition. This enables information that a desired area of an object became focused to be displayed to a user in a manner easy to understand.

19 Claims, 25 Drawing Sheets

FOREIGN PATENT DOCUMENTS

| | | |
|---|---|---|
| JP | 2002-311328 A | 10/2002 |
| JP | 2002-311489 A | 10/2002 |
| JP | 2003-107335 A | 4/2003 |
| JP | 2006-86799 A | 3/2006 |
| JP | 2006-229367 A | 8/2006 |
| JP | 2007-150601 A | 6/2007 |
| JP | 2007-201839 A | 8/2007 |
| WO | WO-2007-007163 A1 | 1/2007 |

* cited by examiner

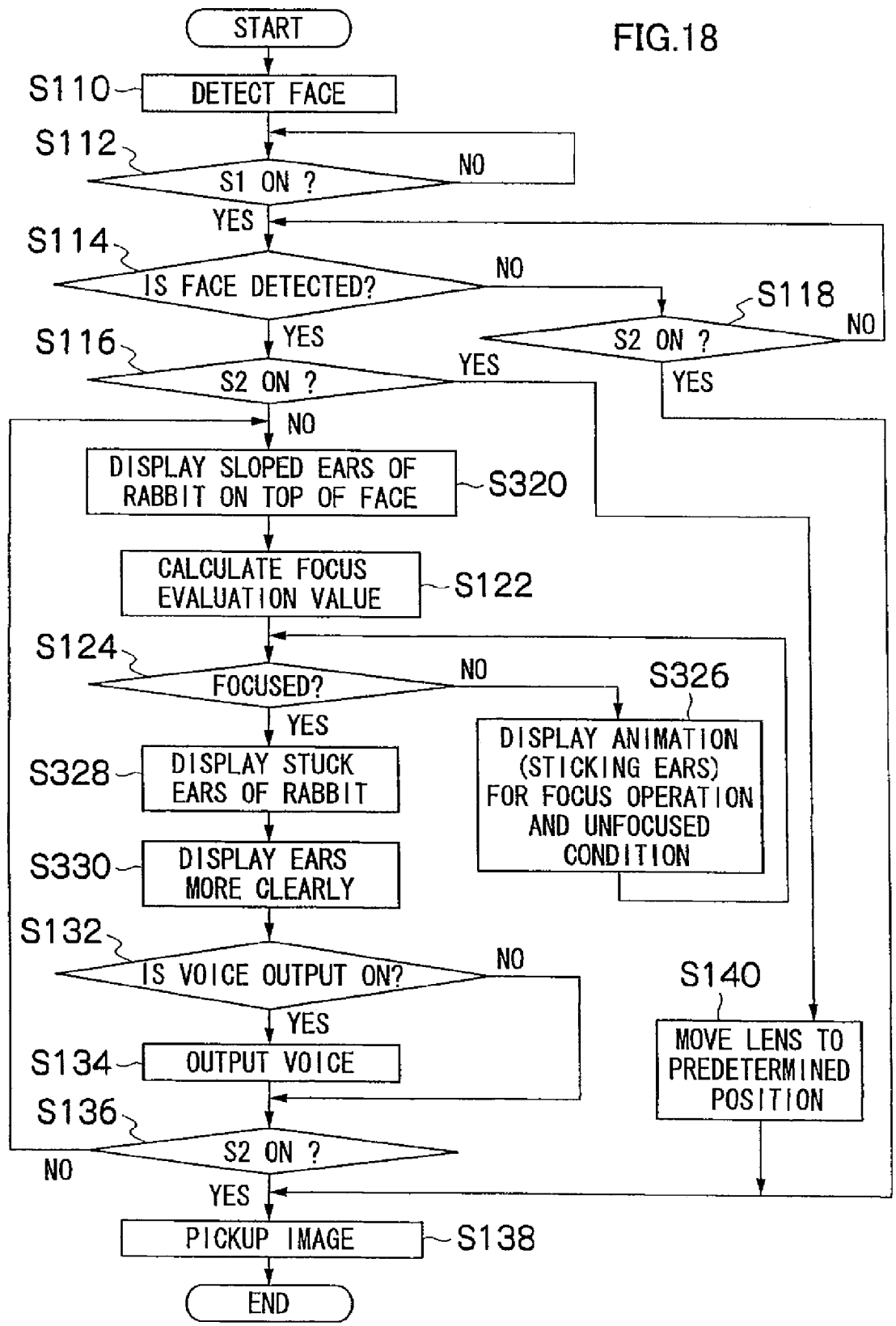

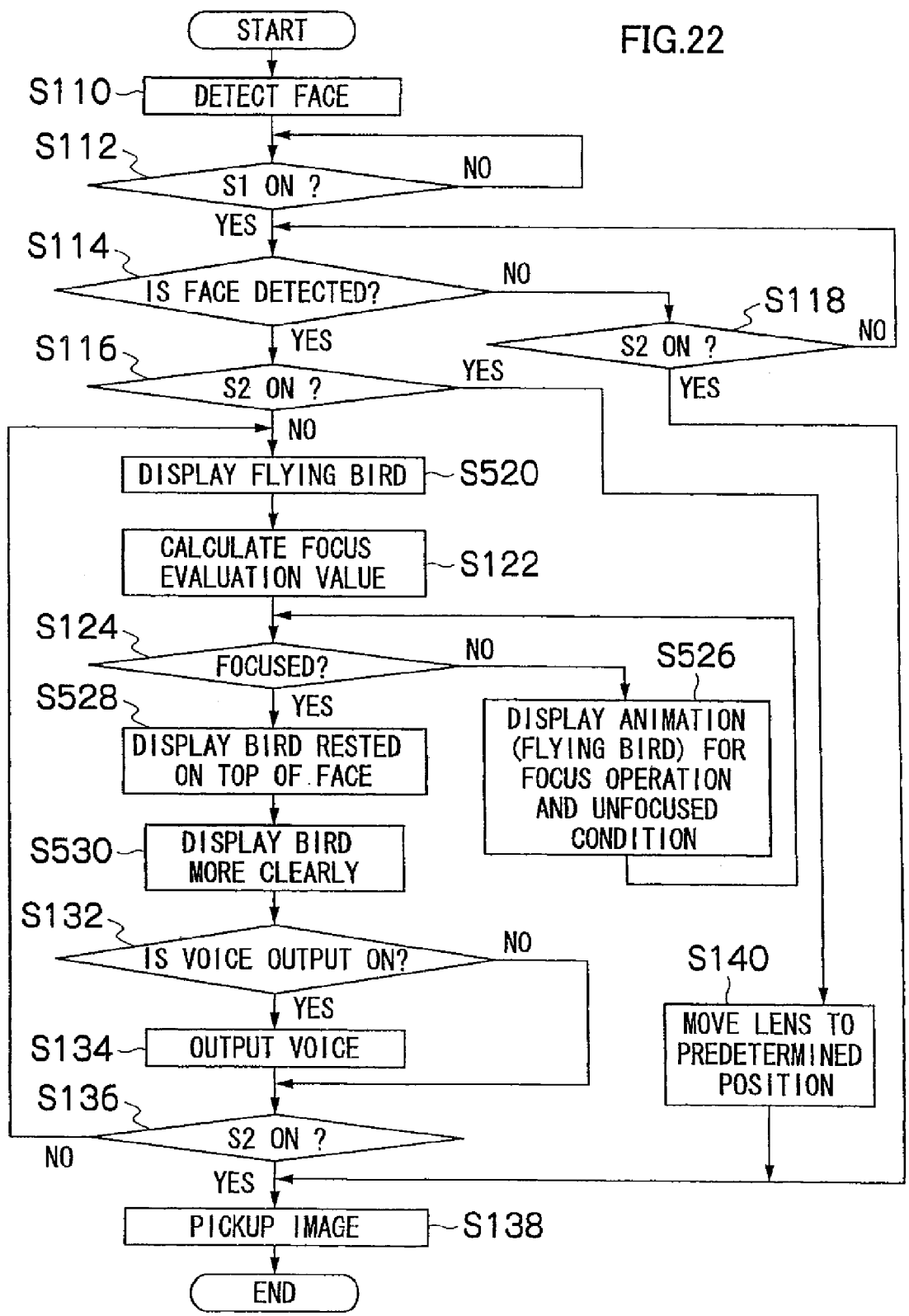

IMAGE PICKUP APPARATUS AND FOCUSING CONDITION DISPLAYING METHOD

BACKGROUND OF THE INVENTION

1. Field of the Invention

The present invention relates to an image pickup apparatus and a focusing condition displaying method, more particularly, to an image pickup apparatus which displays a focusing condition especially in an autofocus operation and a focusing condition displaying method.

2. Description of the Related Art

The methods for displaying information which indicates whether an object is focused or not have been disclosed as follows.

Japanese Patent Application Laid-Open No. 6-113184 proposes an image pickup apparatus which displays a bar graph indicating a state of a switch for focusing condition below an electronic viewfinder so that a user can check a focusing condition.

Japanese Patent Application Laid-Open No. 6-301098 proposes an image pickup apparatus which displays a focus aid gauge so that a user can check whether an object is within its focal depth or not.

Japanese Patent Application Laid-Open No. 2002-311489 proposes an image pickup apparatus which changes a display color or display format of a cross-shaped target mark so that a user can check a focused/unfocused condition.

SUMMARY OF THE INVENTION

However, the image pickup apparatuses described in the above patent documents disadvantageously display information indicating that an object is focused in a manner which cannot be easily understood by every user.

Especially, in consideration of a case where a user such as a child who is not familiar to the operation of the image pickup apparatus picks up an image, such information should be displayed in a manner which attracts a user's attention and is easily understood at a glance.

There exists a technology for detecting an object's face, displaying a square frame around the detected face (see FIG. 28), so that the detected face is focused, but when a user such as a child who is not familiar to the operation of the image pickup apparatus picks up an image, there is a problem that the user cannot be easily informed that the face is detected and that the face is focused.

The present invention has been made in view of the above situation, and one of the objects of the present invention is to provide an image pickup apparatus which is able to display information in an image pickup operation to determine whether an image is focused or not or to easily determine which area is focused, and a focusing condition displaying method.

In order to achieve the object, an image pickup apparatus according to a first aspect of the present invention comprises: an image pickup device which picks up an image of an object; an image capturing device which continuously captures an image signal representing the object via the image pickup device; a displaying device which displays a through-the-lens image based on the captured image signal; an automatic focus adjusting device which performs automatic focus adjustment to maximize the contrast of the object based on the captured image signal; a focusing condition detecting device which detects a focusing condition of the object after the adjustment by the automatic focus adjusting device; and a display control device which composites a display area for displaying focusing information into the through-the-tens image of the displaying device, and also compositing focusing information which is different at least between when an image is not focused and when an image is focused into the display area in response to the focusing condition detected by the focusing condition detecting device.

According to the image pickup apparatus of the first aspect, an image of an object is picked up, and an image signal representing the object is continuously captured, so that based on the captured image signal, a through-the-lens image is displayed by a displaying device into which a display area is composited for displaying focusing information. Also, based on the captured image signal, an automatic focus adjustment is performed to maximize the contrast of the object and the result of the focus adjustment is detected. Based on the detected focusing condition, the focusing information is changed to be composited into the display area. The focusing information includes at least information of an unfocused condition and information of a focused condition. This enables the information indicating that an object is focused on a desired area to be displayed in a manner easily understood by a user.

The image pickup apparatus according to a second aspect of the present invention, in the image pickup apparatus according to the first aspect further comprises a face detection device which detects the object's face from the captured image signal, and the automatic focus adjusting device performs automatic focus adjustment on the detected face when the face is detected by the face detection device.

According to the image pickup apparatus of the second aspect, the object's face is detected from the captured image signal, and when the face is detected, an automatic focus adjustment is performed on the detected face. This prevents any failure of unfocused condition of a main object.

In the image pickup apparatus according to a third aspect of the present invention, in the image pickup apparatus according to the second aspect, the display control device composites a display area displayed on the through-the-lens image on the displaying device into a location near the face detected by the face detection device.

According to the image pickup apparatus of the third aspect, when the face is detected, a display area displayed on the through-the-lens image is composited into a location near the detected face. This enables information indicating which area is focused to be displayed in a manner easily understood by a user.

In the image pickup apparatus according to a fourth aspect of the present invention, in the image pickup apparatus according to the third aspect, the display area displayed on the through-the-lens image on the displaying device by the display control device has a dialogue balloon shape.

According to the image pickup apparatus of the fourth aspect, a display area having a dialogue balloon shape is composited into a through-the-lens image. This allows a user to be informed of a focusing condition by a display which attracts a user's attention.

The image pickup apparatus according to a fifth aspect of the present invention, in the image pickup apparatus according to any one of the first to fourth aspects, further comprises a storing device which stores focusing information corresponding to a focusing condition which includes at least information of an unfocused condition and information of a focused condition, and the display control device composites the focusing information stored in the storing device into the display area.

According to the image pickup apparatus of the fifth aspect, focusing information including information of an unfocused condition and information of a focused condition is stored, and focusing information corresponding to a focusing condition among the stored focusing information is displayed. This enables a focusing condition to be displayed in a manner easily understood by a user, and the display allows the user to easily judge the focusing condition.

The image pickup apparatus according to a sixth aspect of the present invention, in the image pickup apparatus according to the fifth aspect, further comprises an input device which inputs focusing information in response to a focusing condition, and the storing device stores the focusing information input by the input device, and when a plurality of pieces of focusing information corresponding to an identical focusing condition are stored in the storing device, the display control device selects a desired piece of the focusing information from the plurality of pieces of the focusing information, and composites the piece into the display area.

According to the image pickup apparatus of the sixth aspect, focusing information input via an input device is further stored, so that a plurality of pieces of focusing information corresponding to an identical focusing condition are stored. When a plurality of pieces of focusing information corresponding to an identical focusing condition are stored, a desired piece of the focusing information is selected from the plurality of pieces of focusing information to be definitely displayed. This allows a customization in accordance with a user's preference.

In the image pickup apparatus according to a seventh aspect of the present invention, in the image pickup apparatus according to the fifth or sixth aspect, the display control device switches the focusing information from the information of an unfocused condition to the information of a focused condition upon a detection of a focus adjustment by the focusing condition detecting device.

According to the image pickup apparatus of the seventh aspect, before a focusing operation, information of an unfocused condition is displayed, and during a focus adjustment, the information of an unfocused condition is switched into information of a focused condition of a focused image, so that when an image is focused, the information of a focused condition is displayed. This allows a user to be definitely informed of a focusing condition by a display which attracts a user's attention.

In the image pickup apparatus according to an eighth aspect of the present invention, in the image pickup apparatus according to any one of the second to sixth aspects, the face detection device detects an object's face and expression, and the display control device composites focusing information based on the expression detected by the face detection device into the display area.

According to the image pickup apparatus of the eighth aspect, an object's face and expression are detected, and focusing information based on the detected expression is displayed. This allows a user to be informed of a focusing condition in a manner easy to understand by a display which attracts a user's attention.

In the image pickup apparatus according to a ninth aspect of the present invention, in the image pickup apparatus according to any one of the first to eighth aspects, the display control device changes the size of the display area in response to the detected result by the focusing condition detecting device.

According to the image pickup apparatus of the ninth aspect, in response to a focusing condition, the size of a display area is changed. This allows a user to be informed of a focusing condition in a manner easy to understand.

The image pickup apparatus according to a tenth aspect of the present invention includes: an image pickup device which picks up an image of an object; an image capturing device which continuously captures an image signal representing the object via the image pickup device; a displaying device which displays a through-the-lens image based on the captured image signal; an automatic focus adjusting device which performs automatic focus adjustment to a desired area of the object based on the captured image signal; a focusing condition detecting device which detects a focusing condition of the object after the adjustment by the automatic focus adjusting device; an animated image generating device which generates an animated image having at least one of the features: variable position; variable size; and variable shape, and displays a different image at least between when an image is not focused and when an image is focused; and a display control device which composites the animated image into the through-the-lens image in response to the focusing condition detected by the focusing condition detecting device.

According to the image pickup apparatus of the tenth aspect, an image of an object is picked up, and an image signal representing the object is continuously captured, so that based on the captured image signal, a through-the-lens image is displayed. Also, based on the captured image signal, an automatic focus adjustment is performed to a desired area of the object, and then a focusing condition of the object is detected, so that in response to the detected focusing condition, an animated image is composited into the through-the-lens image. The animated image has at least one of the features: variable position; variable size; and variable shape, and is generated in advance to include different images to be displayed at least between when an image is not focused and when an image is focused. In the automatic focus adjusting device, generally, a contrast AF system is used for focus adjustment to maximize a contrast of a desired area of an object, but other system may be used. This enables information indicating that a desired area of an object became focused to be displayed in a manner easily understood by a user.

The image pickup apparatus according to an eleventh aspect of the present invention, in the image pickup apparatus according to the tenth aspect, further includes a face detection device which detects the object's face from the captured image signal, and the automatic focus adjusting device performs automatic focus adjustment on the detected face when the face is detected by the face detection device.

According to the image pickup apparatus of the eleventh aspect, the object's face is detected from the captured image signal, and when the face is detected, the detected face is focused. This prevents any failure of an unfocused condition of a main object.

In the image pickup apparatus according to a twelfth aspect of the present invention, in the image pickup apparatus according to any one of the tenth and eleventh aspects, the display control device changes at least one of hue, lightness, and saturation of the animated image in response to the focusing condition detected by the focusing condition detecting device.

According to the image pickup apparatus of the twelfth aspect, at least one of hue, lightness, and saturation of the animated image is changed in response to a detected focusing condition. This enables a focusing condition to be displayed in a manner easily understood by a user.

In the image pickup apparatus according to a thirteenth aspect of the present invention, in the image pickup apparatus according to any one of the tenth to twelfth aspects, the animated image generating device generates an animated image having a plurality of frames which are concentrically displayed, with the plurality of frames having different sizes and rotating until the focusing condition detecting device detects a focused condition, and the plurality of frames having an equal size to each other and stopping when the focusing condition detecting device detects a focused condition.

According to the image pickup apparatus of the thirteenth aspect, an animated image having a plurality of concentric frames is composited into a through-the-lens image, and the frames have different sizes and rotate until a focused condition is detected, and have an equal size to each other and stop rotating when a focused condition is detected. The frames may have various shapes including any geometric configuration (such as a circle, an oval, and a rectangular) and a heart shape. This allows a user to be definitely informed of a focusing condition by a display which attracts a user's attention.

In the image pickup apparatus according to a fourteenth aspect of the present invention, in the image pickup apparatus according to any one of the tenth to twelfth aspects, the animated image generating device generates an animated image having the plurality of frames which rotate in different directions from each other until the focusing condition detecting device detects a focused condition. Such rotations of a plurality of frames in different directions allow a user to be more clearly informed of a focused condition.

In the image pickup apparatus according to a fifteenth aspect of the present invention, in the image pickup apparatus according to any one of the tenth to twelfth aspects, the animated image generating device generates an animated image having the frames which continue to rotate in predetermined directions at predetermined angular velocities until the focusing condition detecting device detects a focused condition.

According to the image pickup apparatus of the fifteenth aspect, the frames continue to rotate in predetermined directions at predetermined angular velocities until a focused condition is detected. This allows a user to be definitely informed of a focusing condition by a display which attracts a user's attention.

In the image pickup apparatus according to a sixteenth aspect of the present invention, in the image pickup apparatus according to any one of the tenth to twelfth aspects, the animated image generating device generates an animated image having a frame which continues to shake near the desired area until a focused condition is detected by the focusing condition detecting device. This allows a user to be definitely informed of a focusing condition by a display which attracts a user's attention.

In the image pickup apparatus according to a seventeenth aspect, in the image pickup apparatus according to any one of the thirteenth to sixteenth aspects, the display control device changes a distance between the frame and the area to which the focus adjustment has been performed in response to the focusing condition detected by the focusing condition detecting device, and when the focusing condition detecting device detects a focused condition, the frame is overlapped and displayed over the area to which the automatic focus adjustment has been performed.

According to the image pickup apparatus of the seventeenth aspect, the distance between the frame and the area to which the focus adjustment has been performed is changed in response to a focusing condition, and when the focusing condition detecting device detects a focused condition, the frame is overlapped and displayed over the area to which the focus adjustment has been performed. This enables information indicating which area is focused to be displayed in a manner easily understood by a user.

In the image pickup apparatus according to an eighteenth aspect of the present invention, in the image pickup apparatus according to any one of the tenth to twelfth aspects, the animated image generating device generates an animated image of ears of an animal which change the posture thereof in response to the focusing condition detected by the focusing condition detecting device so that the ears slope down when an image is not focused and the ears stick up when an image is focused, and the display control device causes the animated image to be overlapped and displayed over the area to which the focus adjustment has been performed.

According to the image pickup apparatus of the eighteenth aspect of the present invention, an animated image is composited into a through-the-lens image, wherein ears of an animal which change the posture thereof in response to a focusing condition so that the ears slope down when an image is not focused and the ears stick up when an image is focused in response to a focusing condition. This allows a user to be definitely informed of a focusing condition.

In the image pickup apparatus according to a nineteenth aspect of the present invention, in the image pickup apparatus according to the eighteenth aspect, when the automatic focus adjusting device performs a focus adjustment to an object's face, and the display control device causes the animated image to be overlapped and displayed over the object's face.

According to the image pickup apparatus of the nineteenth aspect, an animation of ears of an animal which change the posture thereof is overlapped and displayed over a detected object's face, which allows a user to be definitely informed of a focusing condition.

In the image pickup apparatus according to a twentieth aspect of the present invention, in the image pickup apparatus according to any one of the tenth to twelfth aspects, the animated image generating device generates an animated image which displays a different part of an animal in response to the focusing condition detected by the focusing condition detecting device so that an animation of only a part of the animal is displayed when the desired area of the object is not focused and the entire animal is displayed when the desired area of the object is focused, and the display control device causes the animated image to be overlapped and displayed over the area to which an automatic focus adjustment has been performed.

According to the image pickup apparatus of the twentieth aspect, an animated image which displays a different part of an animal in response to a focusing condition is overlapped and displayed over the area to which an automatic focus adjustment has been performed so that an animation of only a part of a character such as an animal is displayed when the desired area of the object is not focused and the entire character is displayed when the desired area of the object is focused. This enables a focusing condition to be displayed in a manner easily understood by a user.

In the image pickup apparatus according to a twenty-first aspect of the present invention, in the image pickup apparatus according to any one of the tenth to twelfth aspects, the animated image generating device generates an animated image which displays a different status of an animal that naturally flies in response to the focusing condition detected by the focusing condition detecting device so that a flying animal is displayed when the desired area of the object is not focused, and a resting animal is displayed when the desired area of the object is focused, and the display control device causes the animated image of the flying animal to be located near the area to which an automatic focus adjustment has been performed when the focusing condition detecting device detects a focused condition.

According to the image pickup apparatus of the twenty-first aspect of the present invention, an animated image is composited into a location near the area to which an automatic focus adjustment has been performed, so that the animated image of a flying animal is displayed when the desired area of the object is not focused, and when the desired area of the object is focused, the animal stops flying and is located near the area to which an automatic focus adjustment has been performed. This enables a focusing condition to be displayed in a manner easily understood by a user. In addition, this allows a user to know that the position where the animal is located is focused, that is, to know where the focused area is, in a manner easily understood for the user.

In the image pickup apparatus according to a twenty-second aspect of the present invention, in the image pickup apparatus according to any one of the tenth to twelfth aspects, the animated image generating device generates an animated image which displays a different flower stage in response to the focusing condition detected by the focusing condition detecting device, so that a flower bud is displayed when the desired area of the object is not focused and a blooming flower is displayed when the desired area of the object is focused, and the display control device causes the animated image to be displayed at a location near the area to which an automatic focus adjustment has been performed.

According to the image pickup apparatus of the twenty-second aspect, an animated image which displays a different flower stage in response to a focusing condition is composited into a location near the area to which an automatic focus adjustment has been performed, so that a flower bud is displayed when the desired area of the object is not focused, and the bud blooms when the desired area of the object is focused. This enables a focusing condition to be displayed in a manner easily understood by a user.

In the image pickup apparatus according to a twenty-third aspect of the present invention, in the image pickup apparatus according to any one of the tenth to twelfth aspects, the animated image generating device generates an animated image of a dialogue balloon which has a different size in response to the focusing condition detected by the focusing condition detecting device, and the display control device causes the animated image to be displayed at a location near the area to which an automatic focus adjustment has been performed.

According to the image pickup apparatus of the twenty-third aspect, an animated image of a dialogue balloon which has a different size in response to a focusing condition is composited into a location near the area to which an automatic focus adjustment has been performed. This enables a focusing condition to be displayed in a manner easily understood by a user.

In the image pickup apparatus according to a twenty-fourth aspect of the present invention, in the image pickup apparatus according to the twenty-third aspect, the animated image generating device generates an animated image of a dialogue balloon which has a different image therein at least between when the desired area of the object is focused and when the desired area of the object is not focused.

According to the image pickup apparatus of the twenty-fourth aspect, an animated image of a dialogue balloon which has a different size and a different image therein at least between when the desired area of the object is focused and when the desired area of the object is not focused in response to a focusing condition is composited into a location near the area to which an automatic focus adjustment has been performed. This enables a focusing condition to be displayed in a manner easily understood by a user.

A focusing condition displaying method according to a twenty-fifth aspect of the present invention includes: a step of continuously capturing an image signal of the object; a step of displaying a through-the-lens image based on the captured image signal; a step of performing an automatic focus adjustment to a desired area of the object based on the captured image signal; a step of detecting the focus adjusted condition; and a step of compositing a display area for displaying focusing information into the through-the-lens image, and also compositing focusing information which is different at least between when the desired area of the object is not focused and when the desired area of the object is focused in response to the detected focusing condition, into the display area.

A focusing condition displaying method according to a twenty-sixth aspect of the present invention includes: a step of continuously capturing an image signal of the object; a step of displaying a through-the-lens image based on the captured image signal; a step of performing an automatic focus adjustment to a desired area of the object based on the captured image signal; a step of detecting the focus adjusted condition; and a step of compositing an animated image which displays focusing condition into the through-the-lens image in response to the detected focus adjusted condition.

In the focusing condition displaying method according to a twenty-seventh aspect of the present invention, in the focusing condition displaying method according to the twenty-sixth aspect, the step of performing an automatic focus adjustment further includes: a step of detecting an object's face from the captured image signal; and a step of performing an automatic focus adjustment onto the detected face.

In the focusing condition displaying method according to a twenty-eighth aspect of the present invention, in the focusing condition displaying method according to the twenty-fifth or seventeenth aspect, the step of compositing the animated image into a through-the-lens image further includes:

a step of generating an animated image having at least one of the features: variable position; variable size; and variable shape, and displays a different image at least between when the desired area of the object is not focused and when the desired area of the object is focused; and a step of compositing the generated animated image into a through-the-lens image.

In the focusing condition displaying method according to a twenty-ninth aspect of the present invention, in the focusing condition displaying method according to the twenty-eighth aspect, the step of compositing the animated image composites the animated image into the through-the-lens image after changing at least one of hue, lightness, and saturation of the animated image in response to the detected focus adjusted condition.

According to the present invention, information to easily determine whether an image is focused or not, or to easily determine which area is focused can be displayed in an image pickup operation.

BRIEF DESCRIPTION OF THE DRAWINGS

FIG. 18 is a flowchart showing a third embodiment of processes for an animated image display of the digital camera;

FIG. 22 is a flowchart showing a fifth embodiment of processes for an animated image display of the digital camera;

FIG. 27A is a display example when a focusing operation has been started, FIG. 27B is a display example when the focusing operation is progressing, and FIG. 27C is a display example when the focusing operation has been completed.

DETAILED DESCRIPTION OF THE PREFERRED EMBODIMENTS

Now, in accordance with the appended drawings, preferred embodiments to achieve a camera according to the present invention will be explained in detail below.

First Embodiment

Figure 1:
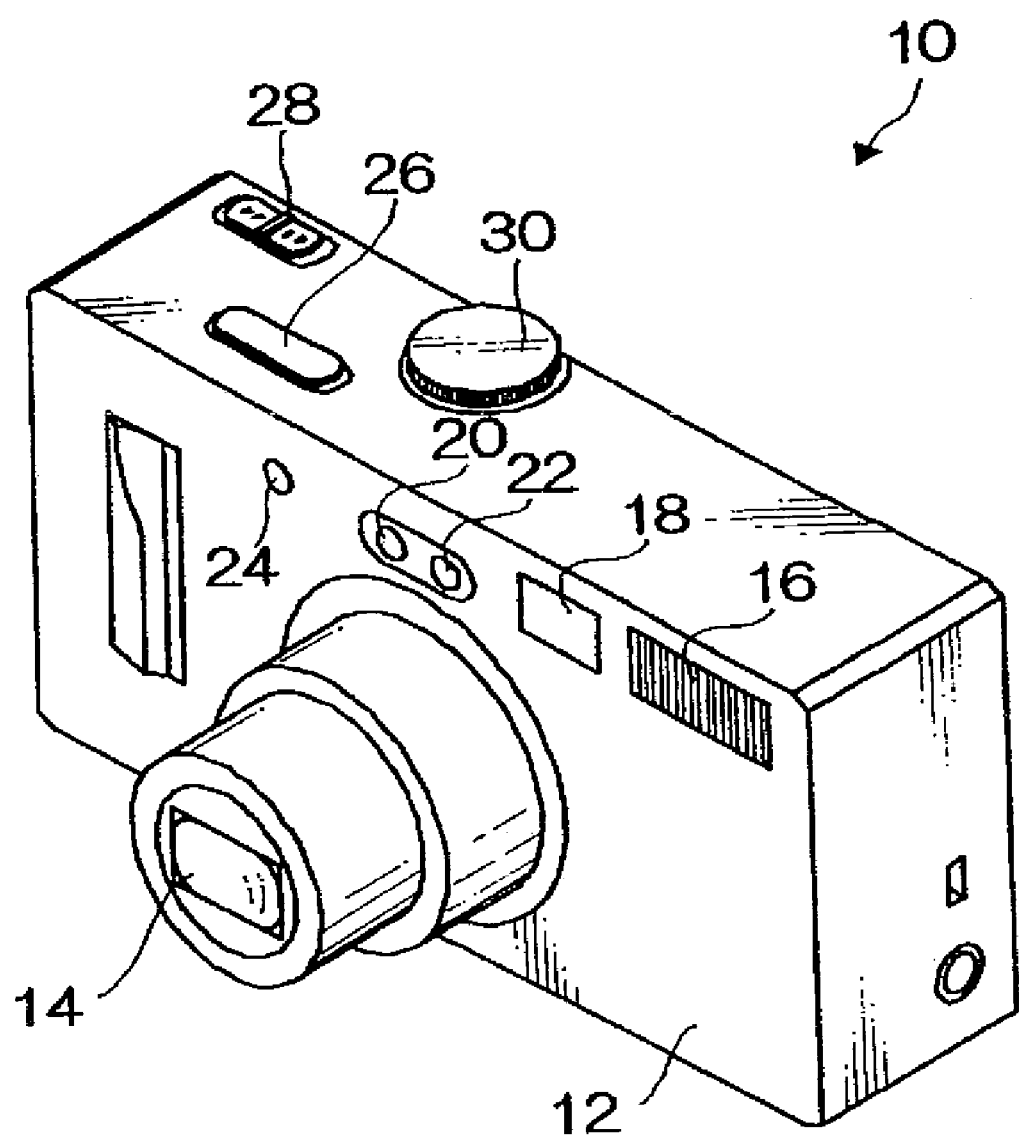
FIG. 1 is a front perspective view showing a first embodiment of a digital camera to which the present invention is applied.
Figure 2:
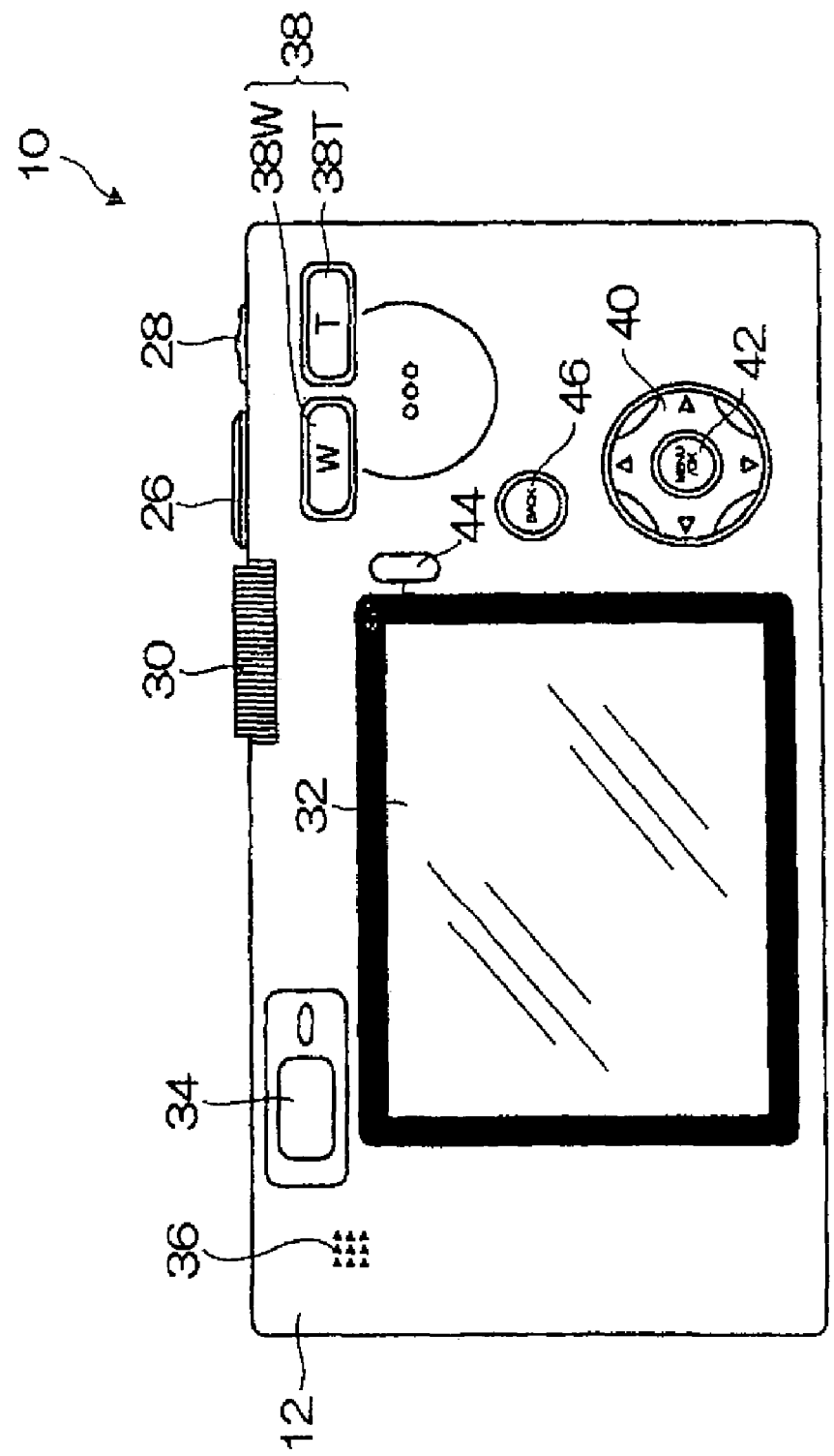
FIG. 2 is a rear view of a first embodiment of the digital camera.

FIG. 1 is a front perspective view showing one embodiment of an image pickup apparatus according to a first embodiment of the present invention. FIG. 2 is a rear view of one embodiment of the image pickup apparatus. The image pickup apparatus is a digital camera which receives a light through lenses at an image pickup element thereof, and converts the light into a digital signal to store in a storage media.

A digital camera 10 has a camera body 12 in a square box shape which is laterally long, and the camera body 12 is provided with, as shown in FIG. 1, a lens 14, an electronic flash 16, a viewfinder 18, a self timer lamp 20, an AF auxiliary lamp 22, a flash light adjustment sensor 24, and the like on the front side thereof. The camera body 12 is also provided with a shutter button 26, a power/mode switch 28, a mode dial 30, and the like on the top side thereof. The camera body 12 is further provided with, as shown in FIG. 2, a monitor 32, a finder eyepiece 34, a speaker 36, a zoom button 38, a cross-shaped button 40, a MENU/OK button 42, a DISP button 44, a BACK button 46, and the like on the rear side thereof.

The camera body 12 has a lower surface (not shown) which is provided with a threaded hole for tripod, a battery compartment and a memory card slot under an openable/closable cover, and a battery and a memory card are loaded into the battery compartment and the memory card slot, respectively.

The lens 14 is configured with a collapsible zoom lens, and is extended out of the camera body 12 when an image pickup mode is set using the power/mode switch 28. The zoom mechanism and collapsible mechanism of the lens 14 are based on a known technology, and the specific structures will not be explained in detail below.

The electronic flash 16 includes a light emitting section which is configured to swing in a horizontal direction and a vertical direction so that a flash light can be radiated toward a main object. The structure of the electronic flash 16 will be explained in detail below.

The viewfinder 18 is a window through which an object to be picked up is determined.

The self timer lamp 20 is formed of an LED for example, and emits light at an image pickup using a self-timer for an image pickup after a certain period of time, after the shutter button 26 is pressed which will be explained later.

The AF auxiliary lamp 22 is formed of a high luminance LED for example, and emits light in response to an AF.

The flash light adjustment sensor 24 adjusts the amount of light of the electronic flash 16 as will be described later.

The shutter button 26 is a two-stage switch with so-called "half-press" and "full-press". The "half-press" of the shutter button 26 causes AE/AF to operate, and the "full-press" of the shutter button 26 causes the digital camera 10 to perform an image pickup.

The power/mode switch 28 functions as a power switch to turn on/off the digital camera 10 and also functions as a mode switch to set a mode of the digital camera 10, and is slidably arranged between an "OFF position", a "REPRODUCTION position", and an "IMAGE PICKUP position". The digital camera 10 is turned on when the power/mode switch 28 is slided to be aligned with the "REPRODUCTION position" or the "IMAGE PICKUP position", and is turned off when the power/mode switch 28 is aligned with the "OFF position". The alignment of the power/mode switch 28 with the "REPRODUCTION position" causes a "REPRODUCTION mode" to be set, and the alignment with the "IMAGE PICKUP position" causes an "IMAGE PICKUP mode" to be set.

The mode dial 30 functions as an image pickup mode setting device which sets an image pickup mode of the digital camera 10, and the setting positions of the mode dial allow the image pickup mode of the digital camera 10 to be varied into different modes. The modes include for example: an "auto image pickup mode" for automatically setting an aperture, a shutter speed, and the like of the digital camera 10; a "dynamic image pickup mode" for picking up dynamic images; a "person image pickup mode" which is suitable to pickup images of persons; a "sport image pickup mode" which is suitable to pickup images of moving bodies; a "landscape image pickup mode" which is suitable to pickup images of landscapes; a "nightscape image pickup mode" which is suitable to pickup images of nightscapes; an "aperture-priority image pickup mode" in which a photographer sets an aperture calibration and the digital camera 10 automatically sets a shutter speed; a "shutter speed-priority image pickup mode" in which a photographer sets a shutter speed and the digital camera 10 automatically sets an aperture calibration; a "manual image pickup mode" in which a photographer sets an aperture, a shutter speed, and the like; and a "person detecting image pickup mode" in which a person is automatically detected and a flash light is emitted toward the person, which will be explained in detail later.

The monitor 32 is a crystal liquid display which provides color display. The monitor 32 is used as an image display panel for displaying a picked up image in the reproduction mode, and also used as a user interface display panel for various setting operations. In addition, in an image pickup mode, a through-the-lens image is displayed as needed to use the monitor 32 as an electronic finder to check an angle of view.

The speaker 36 outputs a predetermined sound such as voice and buzzer sound when a voice output is turned on by the mode dial 30 and the like.

The zoom button 38 functions as a zoom specifying device which specifies a zoom, and includes a zoom tele button 38T which specifies a zoom toward a telescope side and a zoom wide button 38W which specifies a zoom toward a wide angle side. In the digital camera 10, in an image pickup mode, an operation of the zoom tele button 38T and the zoom wide button 38W causes a focal length of the lens 14 to be changed. Also, in a reproduction mode, an operation of the zoom tele button 38T and the zoom wide button 38W causes the size of a reproduced image to be increased or decreased.

The cross-shaped button 40 functions as a direction specifying device through which a specification of four upward, downward, left, and right directions is input, and is used to select a menu item of a menu screen for example.

The MENU/OK button 42 functions as a button (MENU button) which specifies a switch from a normal screen in each mode to a menu screen, and also functions as a button (OK button) which specifies a determination of a selected content, an execution of a process, and the like.

The DISP button 44 functions as a button which specifies a switch of a display on the monitor 32, and during an image pickup, a press down of the DISP button 44 causes a display on the monitor 32 to be switched from ON→a display of a framing guide→OFF. During a reproduction, a press down of the DISP button 44 causes a display to be switched from normal reproduction→reproduction without letters→multi reproduction.

The BACK button 46 functions as a button which specifies a cancel of an input operation or a return back to a previous operation state.

Figure 3:
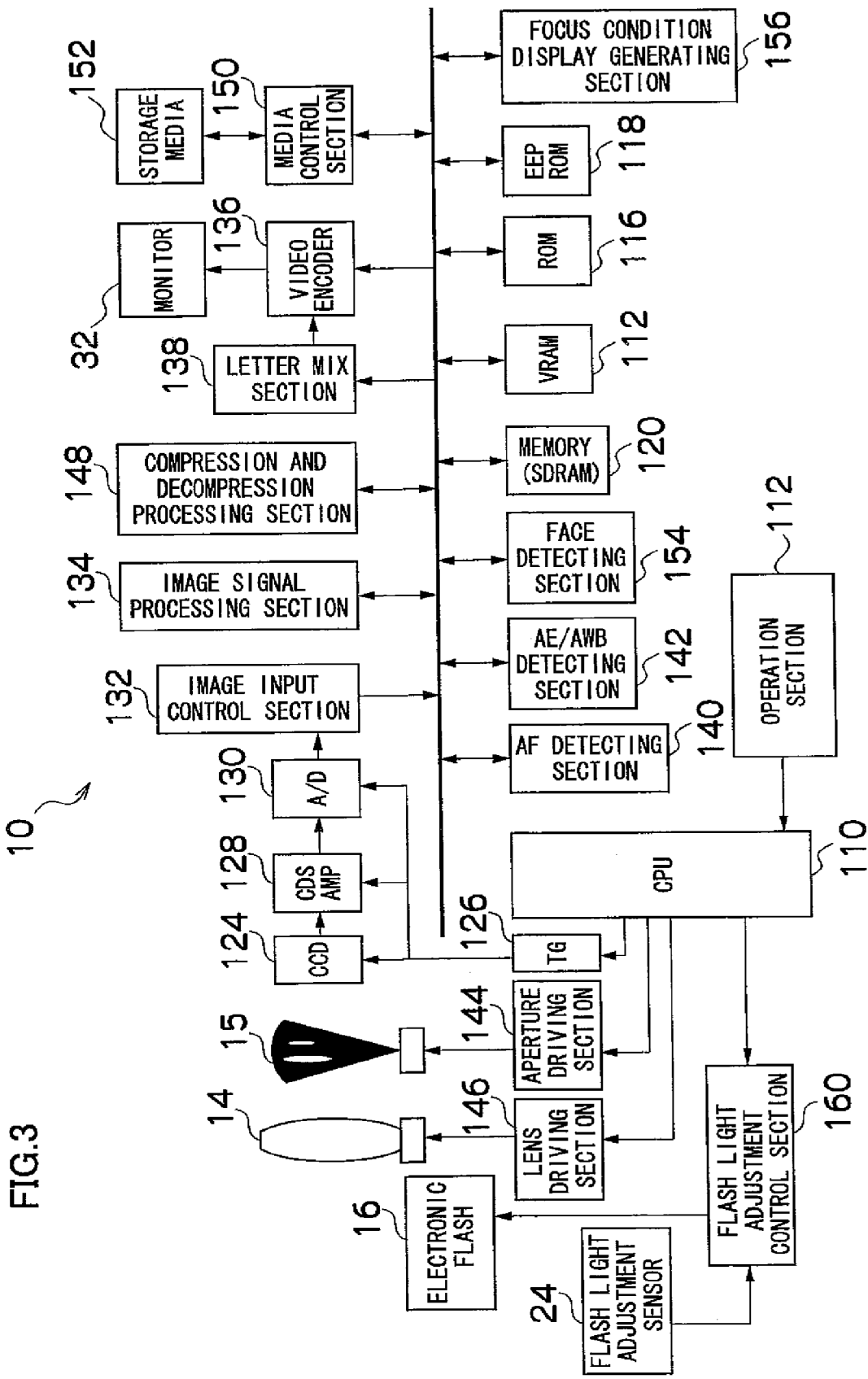
FIG. 3 is a block diagram showing a schematic structure of a first embodiment of the digital camera.

FIG. 3 is a block diagram showing a schematic structure of the inside of the digital camera 10.

As shown in FIG. 3, the digital camera 10 is configured with a CPU 110, an operation section (a shutter button 26, a power/mode switch 28, a mode dial 30, zoom buttons 38, a cross-shaped button 40, a MENU/OK button 42, a DISP button 44, a BACK button 46, and the like) 112, a ROM 116, an EEPROM 118, a memory 120, a VRAM 122, an image pickup element 124, a timing generator (TG) 126, an analog processing section (CDS/AMP) 128, an A/D convertor 130, an image input control section 132, an image signal processing section 134, a video encoder 136, a letter MIX section 138, an AF detecting section 140, an AE/AWB detecting section 142, an aperture driving section 144, a lens driving section 146, a compression and decompression processing section 148, a media control section 150, a storage media 152, a face detecting section 154, a flash light adjustment control section 160, and the like.

The CPU 110 integrally controls the entire digital camera 10 in accordance with a predetermined control program based on an operation signal input from the operation section 112.

The ROM 116 which is connected to the CPU 110 via a bus 114 stores control programs executed by the CPU 110 and various data required for controlling, and the EEPROM 118 stores various setting information with respect to operations of the digital camera 10 such as user setting information. The memory (SDRAM) 120 is used as an area for computing of the CPU 110 and also used as a temporary storage area for image data and the like, while the VRAM 122 is used as a temporary storage area for only image data.

The image pickup element 124 is configured with a color CCD having an array of predetermined color filters, and electronically picks up an image of an object formed by the lens 14. The timing generator (TG) 126 outputs a timing signal for driving the image pickup element 124 in response to a command from the CPU 110.

The analog processing section 128 samples and holds (correlation double sampling process) R, G, and B signals per pixel for the image signal output from the image pickup element 124, and also amplifies the signals to output to the A/D convertor 130.

The A/D convertor 130 converts the analogue R, G, and B signals output from the analog processing section 128 into digital R, G, and B signals, and outputs the signals.

The image input control section 132 outputs the digital R, G, and B signals output from the A/D convertor 130 to the memory 120.

The image signal processing section 134 includes a synchronization circuit (a processing circuit for simultaneous conversion of color signals by compensating a spatial shift of the color signals in a color filter array on a single CCD), a white balance compensation circuit, a gamma correction circuit, a contour correction circuit, a luminance/color-difference signal generation circuit, and the like, and in accordance with a command from the CPU 110, performs a desired signal processing to the input image signal to generate image data (YUV data) including luminance data (Y data) and color difference data (Cr and Cb data).

The video encoder 136 controls a display on the monitor 32 in accordance with a command from the CPU 110. That is, in accordance with a command from the CPU 110, the video encoder 136 converts the input image signal to a video signal to be displayed on the monitor 32 (e.g., NTSC signal, PAL signal, and SCAM signal) and outputs the signal to the monitor 32, and also outputs a predetermined letter and graphic information composited by the letter MIX section 138 as needed to the monitor 32.

The AF detecting section 140 is configured with: a high pass filter which passes only a G signal high frequency component; an absolute value processing section; an AF area detecting section which removes signals in a predetermined focus area (e.g., the central part of a screen); and an integrating section which integrates absolute value data in an AF area.

The AE/AWB detecting section 142 calculates the physical quantity required for AE control and AWB control using the input image signal, in accordance with a command from the CPU 110. For example, as the physical quantity required for AE control, an integrated value of the R, G, and B image signals per area which is obtained by dividing a screen into a plurality of areas (e.g., 16×16).

The aperture driving section 144 and the lens driving section 146 control a driving section 124A of the image pickup element 124 in accordance with a command from the CPU 110, and control the operation of the image pickup lens 14 and the aperture 15.

The compression and decompression processing section 148 performs a compressing process of a predetermined style to the input image data in accordance with a command from the CPU 110, and generates compressed image data. The compression and decompression processing section 148 also performs a decompressing process of a predetermined style to the input compressed image data in accordance with a command from the CPU 110, and generates decompressed image data.

The media control section 150 controls, in accordance with a command from the CPU 110, reading/writing of data of the storage media 152 loaded into a media slot.

The face detecting section 154 extracts a face area of an image from the input image data in accordance with a command from the CPU 110, and detects the position of the area (e.g., the center of gravity of the face area). The extraction of a face area is performed, for example, by extracting skin color data from an original image, and extracting the clusters along optical measuring points determined to have a skin color. Other known methods for extracting a face area from an image include: a method for determining a face area by converting photometric data into hue and saturation, and generating a two dimensional histogram of the converted hue and saturation for analysis; a method for determining a face area by extracting a candidate area for a face which corresponds to a shape of a human face, and determining a face area based on feature quantities in the area; a method for determining a face area by extracting a contour of a human face from an image; a method for extracting a human face by preparing a plurality of templates having shapes of human faces, calculating the correlation between the templates and an image, and determining a face candidate area based on the correlation value, and any of these may be used for the extraction.

The focus condition display generating section 156 generates a dialogue balloon in which letters and symbols are displayed. The CPU 110 identifies the status of an AF which is performed by the AF detecting section 140, and issues a command to the focus condition display generating section 156. In accordance with a command from the CPU 110, the focus condition display generating section 156 generates a letter or graphic corresponding to the AF status. Then, based on position information of the face detected by the face detecting section 154, the CPU 110 issues a command to the letter MIX section 138 to display the display generated by the focus condition display generating section 156 near the face. The display generated by the focus condition display generating section 156 will be explained in detail later.

The flash light adjustment control section 160 controls the light emission of the electronic flash 16 in accordance with a command from the CPU 110.

Next, the operation of the digital camera 10 according to the present embodiment which is configured as described above will be explained below.

First, procedures for a general image pickup and recording processing will be explained below. As described above, the digital camera 10 is set to be in an image pickup mode by aligning the power/mode switch 28 with a image pickup position, and can pick up an image. The setting of an image pickup mode causes the lens 14 to be extended out to establish a stand-by state for an image pickup.

Under the image pickup mode, an object light passes the lens 14 to be focused on a light receiving surface of the image pickup element 124 via the aperture 15. The light receiving surface of the image pickup element 124 has a number of photodiodes (light receiving elements) two dimensionally arranged thereon through read (R), green (G), and blue (B) color filters which are arranged in a predetermined array structure (e.g., Bayer pattern, and G Stripe pattern). The object light through the lens 14 is received by each of the photodiodes to be converted into an amount of a signal charge which corresponds to the amount of the incident light.

The signal charges accumulated in each photodiode are serially read out as voltage signals (image signals) corresponding to the signal charges based on the driving pulse given from the timing generator (TG) 126, to be added to the analog processing section (CDS/AMP) 128.

The analogue R, G, and B signals output from the analog processing section 128 are converted into digital R, G, and B signals by the A/D convertor 130, to be added to the image input control section 132. The image input control section 132 outputs the digital R, G, and B signals output from the A/D convertor 130 to the memory 120.

When a picked up image is output to the monitor 32, the image signals output from the image input control section 132 to the memory 120 are used to generate luminance/color-difference signals by the image signal processing section 134, which are transmitted to the video encoder 136. The video encoder 136 converts the input luminance/color-difference signals into those of a signal style for display (e.g., NTSC color composite video signal), which are output to the monitor 32. In this way, an image picked up by the image pickup element 124 is displayed on the monitor 32.

The image signal is periodically captured from the image pickup element 124, and the image data in the VRAM 122 is periodically rewritten by the luminance/color-difference signal generated from the image signal, to be output to the monitor 32, which enables a real time display of an image picked up by the image pickup element 124. A photographer can see the (through-the-lens) image which is displayed on the monitor 32 in real time to check an angle of view for an image pickup.

The luminance/color-difference signal added from the VRAM 122 to the video encoder 136 is also added to the letter MIX section 138 as needed, so that the signal is composited with a predetermined letter or graphic, and is added to the video encoder 136. This enables an overlapping display of required pickup information over a through-the-lens image.

A press down of the shutter button 26 starts an image pickup. When the shutter button 26 is pressed half way down, an S1ON signal is input to the CPU 110, which causes the CPU 110 to perform an AE/AF process.

First, an image signal captured by the image pickup element 124 via the image input control section 132 is input to the AF detecting section 140 and the AE/AWB detecting section 142.

The integrated data obtained by the AF detecting section 140 is reported to the CPU 110.

The CPU 110 controls the lens driving section 146 to move the group of focusing lenses in the image pickup optical system which includes the lens 14, while calculates focus evaluation values (AF evaluation values) at a plurality of AF detection points, so as to determine a lens position having the local maximum evaluation value to be a focus position. Then, to move the group of focusing lenses to the obtained focus position, the CPU 110 controls the lens driving section 146.

The CPU 110 detects the lightness (object luminance) of the object based on the integrated value obtained from the AE/AWB detecting section 142, to calculate an exposure value (EV value for image pickup) suitable for an image pickup. Then, the obtained EV value for image pickup and a predetermined program diagram are used to determine an aperture value and a shutter speed, and in accordance with these values, the CPU 110 controls an electronic shutter of the image pickup element 124 and the aperture driving section 144 to obtain an appropriate exposure amount. At the same time, using the detected object luminance, the CPU 110 determines whether a light emission from the electronic flash is necessary or not.

The AE/AWB detecting section 142 calculates, in an automatic adjustment of white balance, an average integrated value for each color of the R, G, and B signals for each divided area, and provides the calculation result to the CPU 110. The CPU 110 calculates a ratio R/G and a ratio B/G for each divided area using the obtained integrated value for R, the obtained integrated value for B, and the obtained integrated value for G, so as to determine a light source type based on the distributions in the R/G and B/G color spaces of the obtained R/G and B/G values. In accordance with an adjustment of white balance value which is suitable to the determined light source type, for example so that the each ratio value is approximately 1 (i.e., an integrated ratio of RGB in one screen is R:G:B≦1:1:1), the CPU 110 controls the gain values (white balance correction values) relative to the R, G, and B signals in the adjustment of white balance circuit, and corrects the signal of each color channel.

As described above, a half-press of the shutter button 26 causes an AE/AF process. In this process, a photographer operates the zoom button 38 as needed to adjust an angle of view by adjusting the zoom the lens 14.

After the process, when the shutter button 26 is pressed full way down, an S2ON signal is input to the CPU 110, and the CPU 110 starts an image pickup and recording process. That is, the image pickup element 124 is exposed using the shutter speed and an aperture value determined based on a optical measurement result. In the exposure, when the electronic flash 16 emits light, the flash light adjustment control section 160 controls the emission of the electronic flash 16. The flash light adjustment control section 160 disconnects the electrical current to the electronic flash 16 and stops the emission of the electronic flash 16 when the flash light adjustment sensor 24 receives a predetermined amount of light.

The image signal output from the image pickup element 124 is captured by the memory 120 via the analog processing section 128, the A/D convertor 130, and the image input control section 132, and is converted into a luminance/color-difference signal by the image signal processing section 134 to be stored in the memory 120.

The image data stored in the memory 120 is added to the compression and decompression processing section 148, and is compressed in accordance with a predetermined compression format (e.g., JPEG format) to be stored in the memory 120 as an image file in a predetermined image file format (e.g., Exif format), to be recorded in the storage media 152 via the media control section 150.

In the manner described above, the image recorded in the storage media 152 can be reproduced and displayed on the monitor 32 by aligning the power/mode switch 28 with a reproduction position and setting the digital camera 10 in a reproduction mode.

When the digital camera 10 is set to be in a reproduction mode by aligning the power/mode switch 28 with a reproduction position, the CPU 110 outputs a command to the media control section 150 to read out the latest image file recorded in the storage media 152.

The compressed image data included in the read image file is added to the compression and decompression processing section 148 to be decompressed into a luminance/color-difference signal, which is output to the monitor 32 via the video encoder 136. In this way, the image recorded in the storage media 152 is reproduced and displayed on the monitor 32. In reproducing also, the luminance/color-difference signal of the reproduced image is added to the letter MIX section 138 to be composited with a predetermined letter or graphic, which is added to the video encoder 136 as needed. This enables predetermined image pickup information is overlapped over a pickup image, and is displayed on the monitor 32.

A frame-by-frame playback of an image is performed by an operation of the left and right keys of the cross-shaped button 40, and a press down of the right key of the cross-shaped button 40 causes a next image file to be read out from the storage media 152, which is reproduced and displayed on the monitor 32. A press down of the left key of the cross-shaped button 40 causes a previous image file to be read out from the storage media 152, which is reproduced and displayed on the monitor 32.

In the digital camera 10 of the present embodiment, in order to show a focusing condition to a user, a status of a focusing operation is determined, and a display (focus condition display) corresponding to the status is presented. Now, procedures of the focus condition display will be explained below.

First Embodiment of Focus Condition Display

Figure 4:
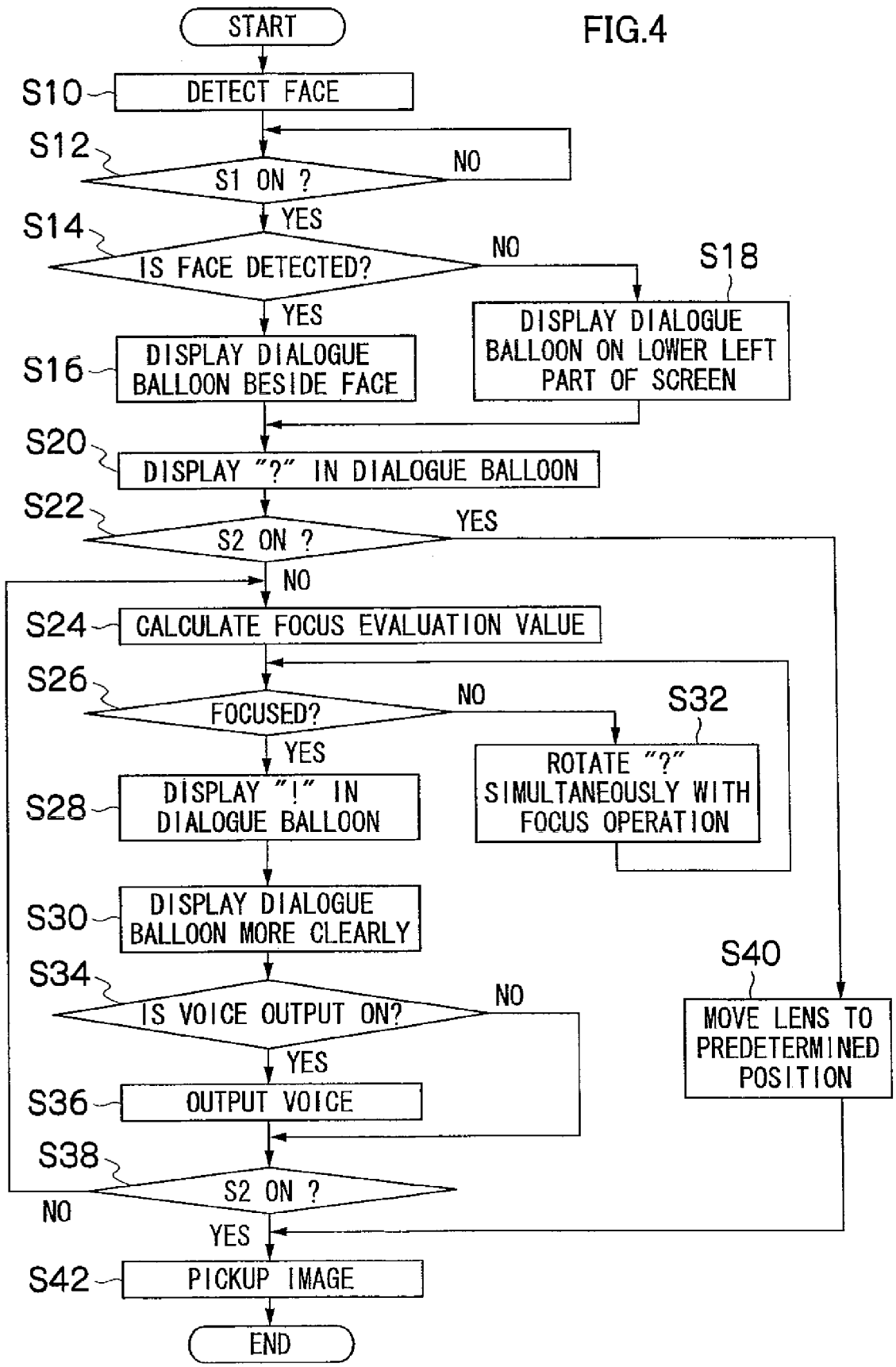
FIG. 4 is a flowchart showing a first embodiment of processes for a focus condition display of the digital camera.

FIG. 4 is a flowchart showing a flow of processes for a focus condition display of the digital camera 10. The following steps are generally executed by the CPU 110.

In a stand-by state for an image pickup where a through-the-lens image is displayed on the monitor 32, the face detecting section 154 detects a face of an object from an input object image, and when the image includes a face, an extraction of a face area and a detection of a face position are performed (Step S10).

It is determined whether a half-press of the shutter button 26 (S1ON) is detected or not (Step S12). When S1ON is not detected (Step S12=NO), Step S12 is repeated.

Figure 5:
FIG. 5 is an example of a focus condition display before a focusing operation is completed.
Figure 6:
FIG. 6 is an example of a focus condition display before a focusing operation is completed.

When S1ON is detected (Step S12=YES), it is determined whether a face has been detected from the object image at Step S10 (Step S14). When a face is detected (Step S14=YES), as shown in FIG. 5, a dialogue balloon which is a display area adjacent to the face area extracted by the focus condition display generating section 156 for displaying focusing information therein is displayed (Step S16), and the letter "?" which is the focusing information when the inside of the dialogue balloon is not focused yet is displayed (Step S16). When a face is not detected (Step S14=NO), as shown in FIG. 6, a dialogue balloon is displayed at a lower left portion of the screen by the focus condition display generating section 156 (Step S18), and the letter "?" which is the focusing information when the inside of the dialogue balloon is not focused yet is displayed (Step S20).

It is determined whether a full-press of the shutter button 26 (S2ON) is detected or not (Step S22). When S2ON is detected (Step S22=YES), an AF cannot be accurately performed, thereby a group of focusing lenses is moved to a predetermined position (Step S40) for an image pickup (Step S42).

When S2ON is not detected (Step S22=NO), the lens driving section 146 is controlled to move the group of focusing lenses while focus evaluation values at a plurality of AF detection points are calculated, so that the lens position having the local maximum evaluation value is determined to be a focus position (Step S24). Then, so as to move the group of focusing lenses to the obtained focus position, the lens driving section 146 is controlled to start the movement of the group of focusing lenses.

It is determined whether the desired area is focused or not (Step S26). When the face is detected at Step S10, it is determined whether the face is focused or not. When the face is not detected at Step S10, it is determined whether the object in a predetermined area around the center of the image or not.

Figure 7:
FIG. 7 is an example of a focus condition display before a focusing operation is completed.
Figure 8:
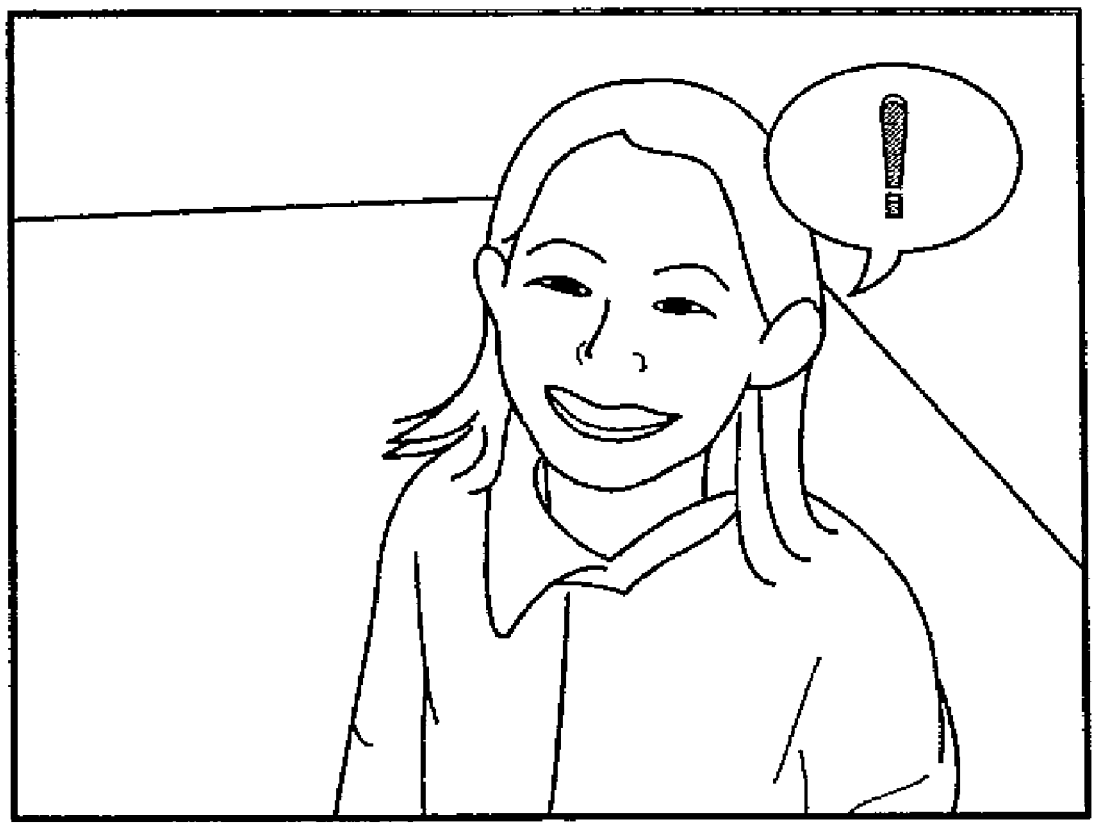
FIG. 8 is an example of a focus condition display when a focusing operation is completed.

When it is determined that the desired area is not focused (Step S26=NO), the group of focusing lenses are moved to the obtained focus point, and at the same time, as shown in FIG. 7, the letter "?" displayed in the dialogue balloon is rotated so that the letter "?" turns to be a letter "!" (Step S32), and Step S26 is repeated. When the desired area is focused, that is, the movement of the group of focusing lenses is completed (Step S26=YES), as shown in FIG. 8, a letter "!" which is the focusing information when the inside of the dialogue balloon is focused is displayed (Step S28), and a lightness of the image is increased to clearly display the dialogue balloon (Step S30).

That is, before a focusing operation is started (Step S20), the letter "?" which is the focusing information when the inside of the dialogue balloon is not focused is displayed, and during the focusing operation (Step S24 to Step S32), the letter "?" is rotated by 90 degrees to gradually switch the letter "?" into the letter so that simultaneously with the end of the focusing process, the letter "!" which is the focusing information when the inside of the dialogue balloon is focused is displayed (Step S28). The letter "?" may be constantly rotated at a predetermined rotation speed, or rotated at a speed which is calculated using the approximate time which is required from the calculation of the focus position to a focusing, or rotated at a speed which is obtained by calculating the time required for the movement of the group of focusing lenses from the focus position obtained at Step S24, and calculating a rotation speed which allows the rotation to end simultaneously with the timing when the predetermined area is focused.

It is determined whether the voice output is turned on (Step S34). When the voice output is turned on (Step S34=YES), a sound such as voice, melody, call and the like which indicates that the focusing is completed is output via the speaker 36 (Step S36), and then it is determined whether S2ON is detected or not (Step S38). When the voice output is not turned on (Step S34=NO), it is determined whether S2ON is detected or not (Step S38).

When S2ON is not detected (Step S38=NO), the process returns back to the step of calculating a focus evaluation value (Step S24). When S2ON is detected (Step S38=YES), an image is picked up (Step S42).

According to the present embodiment, by displaying a dialogue balloon and focusing information, a user's attention is attracted, which allows the user to be informed of the focusing information in a manner easily understood. When an AF has not been accurately performed, no focusing information is displayed, while when an AF has been accurately performed, focusing information corresponding to a focusing condition is displayed, which guides the user to perform an AF operation.

Also, according to the present embodiment, when the face is detected, a dialogue balloon or the like is displayed near the face, which shows the user the focused area in a manner easy to understand. And a voice in addition to the display is output, which indicates the user that the face is focused.

Second Embodiment of Focus Condition Display

Figure 9:
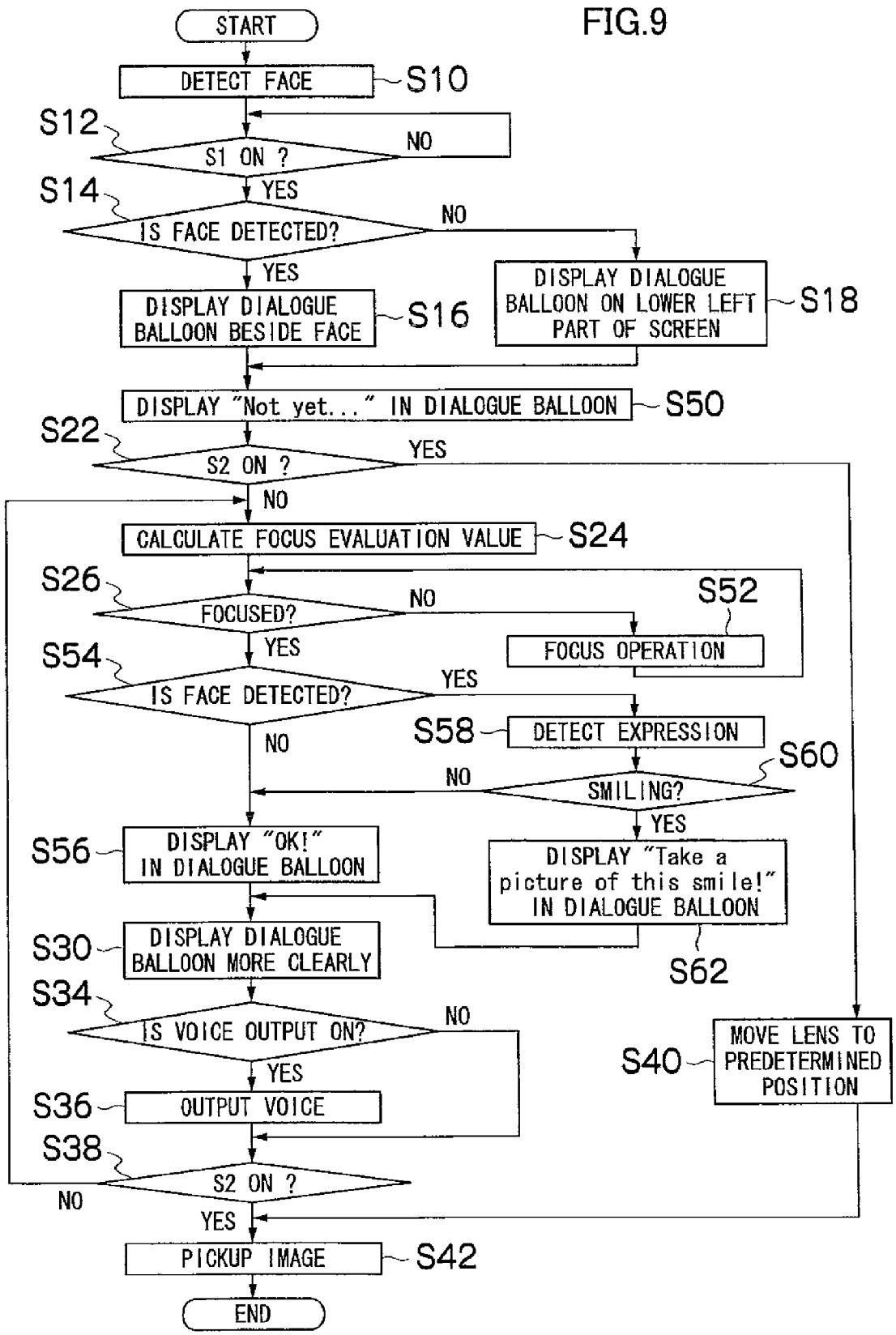
FIG. 9 is a flowchart showing a second embodiment of processes for a focus condition display of the digital camera.

In a second embodiment of a focus condition display, not only a letter is displayed in a dialogue balloon in response to a focusing condition, but also a message is changed in response to an object condition. FIG. 9 is a flowchart showing a flow of processes for a focus condition display of the digital camera 10. The following steps are generally executed by the CPU 110. The following steps are generally executed by the CPU 110. The same parts as those in the first embodiment are denoted by the same reference numerals and will not be described in detail here.

In a stand-by state for an image pickup where a through-the-lens image is displayed on the monitor 32, the face detecting section 154 detects a face of an object from an input object image, and when the image includes a face, an extraction of a face area and a detection of a face position are performed (Step S10).

It is determined whether S1ON is detected or not (Step S12). When S1ON is not detected (Step S12=NO), Step S12 is repeated.

When S1ON is detected (Step S12=YES), it is determined whether a face has been detected from the object image at Step S10 (Step S14). When a face is detected (Step S14=YES), a dialogue balloon is displayed adjacent to the face area (Step S16), and the letters "Not yet . . . " which indicates that the inside of the dialogue balloon is not focused yet is displayed (Step S50). When a face is not detected (Step S14=NO), a dialogue balloon is displayed at a lower left portion of the screen (Step S18), and the letters "Not yet . . . " which is focusing information to indicate that the inside of the dialogue balloon is not focused yet is displayed (Step S50).

It is determined whether S2ON is detected or not (Step S22). When S2ON is detected (Step S22=YES), a group of focusing lenses are moved to a predetermined position (Step S40) for an image pickup (Step S42).

When S2ON is not detected (Step S22=NO), a calculation of focus evaluation values and a determination of a focus position (a start of a focusing operation) are performed (Step S24), so that it is determined whether a desired area is focused or not (Step S26).

When it is determined that the desired area is not focused (Step S26=NO), the group of focusing lenses is moved to the obtained focus point (Step S52), and Step S26 is repeated. When the desired area is focused (Step S26=YES), it is determined whether a face is detected from the focused object image (Step S54).

When a face is not detected from the object image (Step S54=NO), the letters "OK!" which is focusing information indicating that the inside of the dialogue balloon is focused is displayed (Step S56), and a lightness of the image is increased to clearly display the dialogue balloon (Step S30).

When a face is detected from the object image (Step S54=YES), the face detecting section 154 detects an expression of the face detected at Step S54 (Step S58), and determines whether the expression is a smile or not (Step S60).

When the expression is a smile (Step S60=YES), the letters "Take a picture of this smile!" which is focusing information indicating that the inside of the dialogue balloon is focused and that the object is smiling is displayed (Step S62), and a lightness of the image is increased to clearly display the dialogue balloon (Step S30). When the expression is not a smile (Step S60=NO), the letters "OK!" which indicates that the inside of the dialogue balloon is focused, and a lightness of the image is increased to clearly display the dialogue balloon (Step S30).

It is determined whether the voice output is turned on (Step S34). When the voice output is turned on (Step S34=YES), a sound such as voice, melody, call and the like which indicates that the focusing is completed is output via the speaker 36 (Step S36), and then it is determined whether S2ON is detected or not (Step S38). When the voice output is not turned on (Step S34=NO), it is determined whether S2ON is detected or not (Step S38).

When S2ON is not detected (Step S38=NO), the process returns to the step of calculating a focus evaluation value (Step S24). When S2ON is detected (Step S38=YES), an image is picked up (Step S42).

According to the present embodiment, a focusing condition is informed using a sentence, which allows a user to be informed of the focusing condition in a manner easy to understand. This also allows a user to easily judge the focusing condition.

In the above embodiment, focusing information and a focusing condition are associated with each other and recorded in the ROM 116 in advance, so that the focusing information is displayed in a dialogue balloon, but the focusing information may be input by a user. In this case, when a user inputs focusing information corresponding to a focusing condition via the operation section 112, the input focusing information is associated with a focusing condition and recorded in the ROM 116, so that, based on the result of the determination whether a desired area is focused or not (Step S26), focusing information corresponding to a focusing condition is selected from the focusing information input by the user to be displayed in a dialogue balloon. If a plurality of pieces of focusing information for an identical focusing condition are recorded in the ROM 116, the latest piece of focusing information among the recorded focusing information may be automatically selected to be displayed, or a piece of focusing information which is preset by a user may be displayed.

Figure 10:
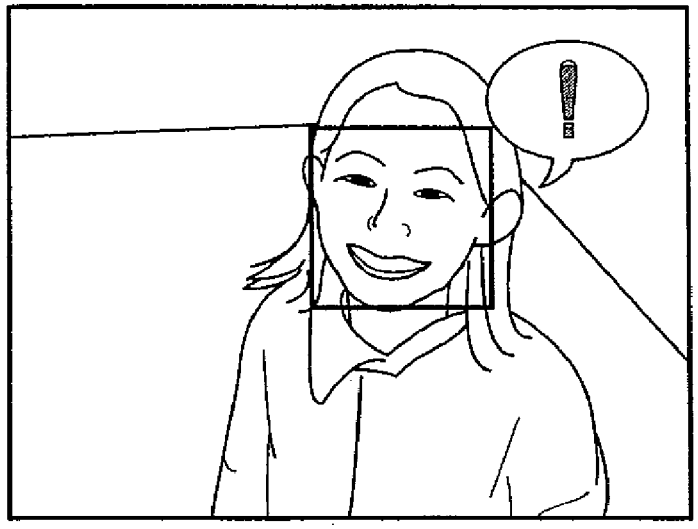
FIG. 10 is an example of a focus condition display when a focusing operation is completed.

In the above embodiment, when the face is detected, a dialogue balloon or the like is displayed near the face, but in addition to that, as shown in FIG. 10, a frame which indicates that a face is detected may be overlapped and displayed over the face, which indicates more clearly that which part is to be focused. The location where a dialogue balloon is displayed is not limited near a face, and the face detecting section 154 may detect a mouth so that dialogue balloon can be located as if it comes out from the mouth.

In the above embodiments, the face detecting section 154 detects a face or a face and its expression, but the face detecting section 154 may detect a movement of a face, that is, a movement of a main object, so that focusing information in response to the movement of the object can be displayed. In other words, when a movement of the object is detected by the face detecting section 154, the displayed focusing information such as "Now!" may be shaken, so that when the movement of the object is no longer detected, that is, when the object stops moving, the shaking of the focusing information such as "Now!" can be stopped to inform a user of the fact that the object stops moving.

Figure 12A:
FIG. 12A is an example of a focus condition display right after a focusing operation is started.
Figure 12B:
FIG. 12B is an example of a focus condition display during a focusing operation.
Figure 12C:
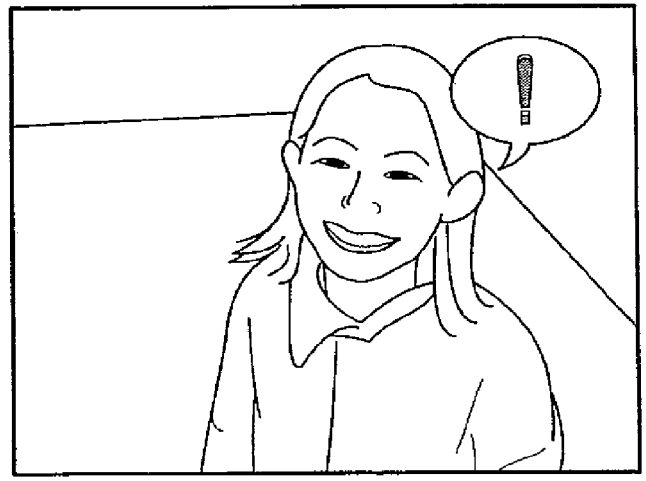
FIG. 12C is an example of a focus condition display when an image is focused.

In the above embodiments, focusing information is displayed in a dialogue balloon to get a user informed of a focusing condition, but the size of a dialogue balloon may be changed to show a focusing condition. For example, at first a small dialogue balloon is shown just as an indication (see FIG. 12A), and as the focusing operations are performed, the dialogue balloon is expanded (see FIG. 12B) to have the maximum size when the focusing is completed (see FIG. 12C).

Figure 11:
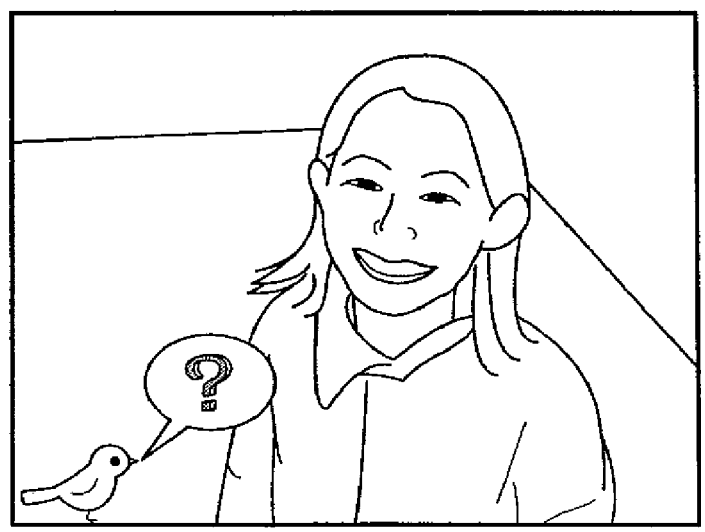
FIG. 11 is an example of a focus condition display before a focusing operation is completed.

In the above embodiments, when a face is not detected, a dialogue balloon is displayed at a lower left portion of a screen, but other display also may be used, and an animation of a person's face or an animal such as a bird may be displayed. For example, as shown in FIG. 11, a bird is displayed at a lower left portion of a screen, so that a dialogue balloon extended from a beak of the bird may be displayed as if the bird is speaking. Alternatively, text information and graphic information may be displayed in a dialogue balloon. Also an animation corresponding to a focusing condition may be displayed in a dialogue balloon. For example, a face icon other than a smiling face may be displayed for an unfocused condition, and a face icon of a smiling face may be displayed for a focused condition.

Second Embodiment

In the first embodiment of the present invention, when the face is detected, a dialogue balloon, text information, or the like is displayed near a face to inform a focused area or a focusing condition to a user in a manner easy to understand, but the method to show a focused area or a focusing condition to a user in a manner easy to understand is not limited to this.

In a second embodiment of the present invention, an animation is displayed to inform a focused area or a focusing condition to a user in a manner easy to understand. Now, the second embodiment of the digital camera 11 will be explained below. The same parts as those in the first embodiment are denoted by the same reference numerals and will not be described here.

Figure 13:
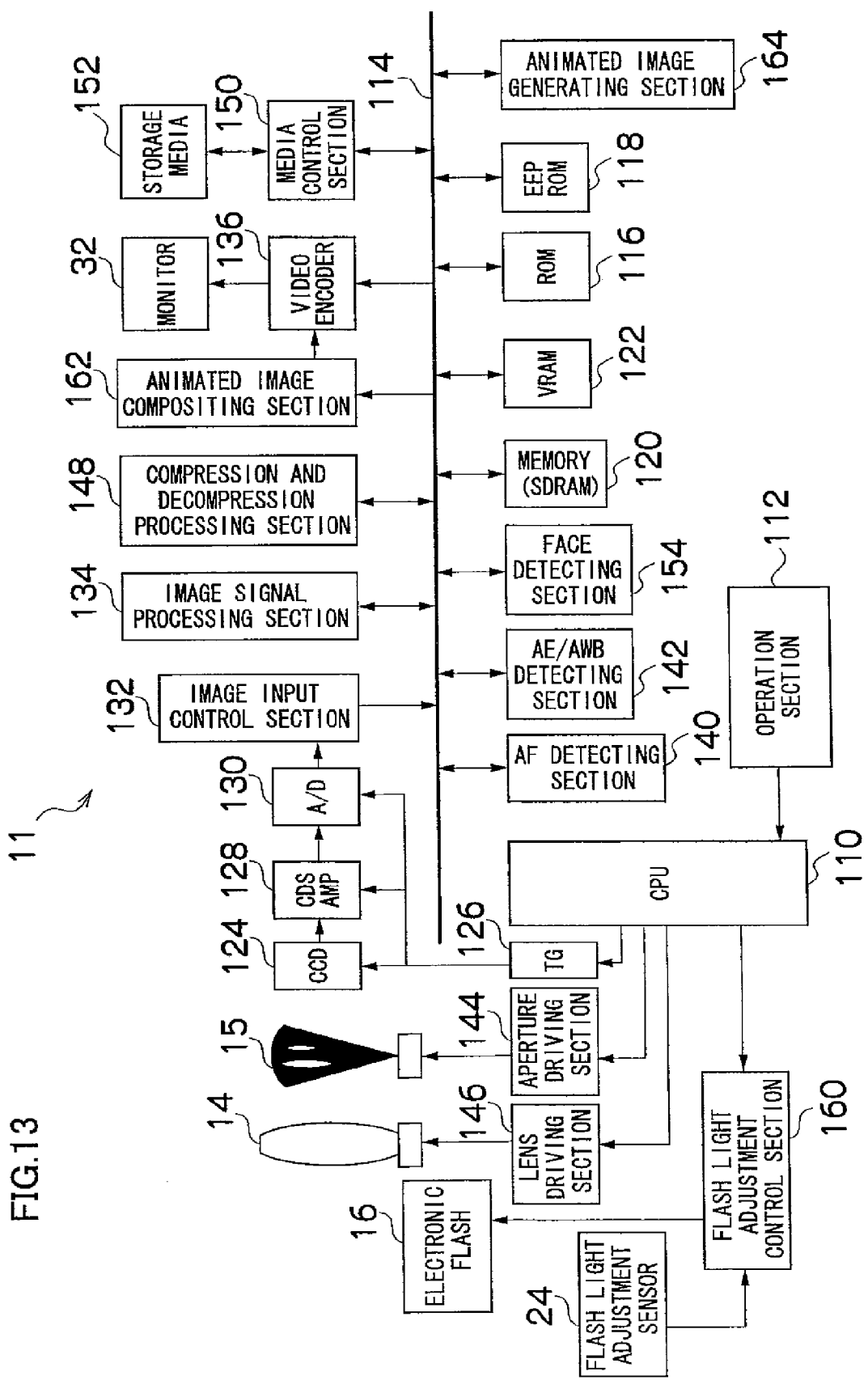
FIG. 13 is a block diagram showing a schematic structure of the digital camera.

FIG. 13 is a block diagram showing a schematic structure of the inside of the digital camera 11.

As shown in FIG. 13, the digital camera 11 includes: a CPU 110, an operation section (a shutter button 26, power/mode switch 28, a mode dial 30, zoom buttons 38, a cross-shaped button 40, a MENU/OK button 42, a DISP button 44, a BACK button 46, and the like) 112, a ROM 116, an EEPROM 118, a memory 120, a VRAM 122, an image pickup element 124, a timing generator (TG) 126, an analog processing section (CDS/AMP) 128, an A/D convertor 130, an image input control section 132, an image signal processing section 134, a video encoder 136, an AF detecting section 140, an AE/AWB detecting section 142, an aperture driving section 144, a lens driving section 146, a compression and decompression processing section 148, a media control section 150, a storage media 152, a face detecting section 154, a flash light adjustment control section 160, an animated image compositing section 162, an animated image generating section 164, and the like.

In accordance with a command from the CPU 110, the video encoder 136 converts an input image signal to a video signal (e.g., NTSC signal, PAL signal, or SCAM signal) which is to be displayed on the monitor 32, and outputs the video signal to the monitor 32, and also outputs predetermined letter information or graphic information which is composited by the animated image compositing section 162 as needed to the monitor 32.

The animated image generating section 164 combines a plurality of static images into an animated image (dynamic image), and generates an animated image such as in an animation GIF, MNG (both of which are style of format) for example. The CPU 110 identifies the status of an AF which is performed by the AF detecting section 140, and issues a command to the animated image generating section 164. In accordance with a command from the CPU 110, the animated image generating section 164 selects a static image corresponding to the AF status, and generates an animated image. Then, based on position information of the face detected by the face detecting section 154, the CPU 110 issues a command to the animated image compositing section 162 to display the animated image generated by the animated image generating section 164. The animated image generating section 164 may store a program to select a static image in response to the object state detected by the face detecting section 154 or the like in the ROM 116, so that the animated image generating section 164 can generate an animated image using the program. This enables a generation of an animated image with realistic sensation. The animated image generated by the animated image generating section 164 will be explained in detail later.

Next, the operation of the digital camera 11 according to the present embodiment which is configured as described above will be explained below. In the digital camera 11 of the present embodiment, in order to show a focusing condition to a user, the status of a focusing operation is determined, and an animated image corresponding to the status is displayed. Now, the procedure to display such an animated image will be explained below.

First Embodiment of Focus Condition Display

Figure 14:
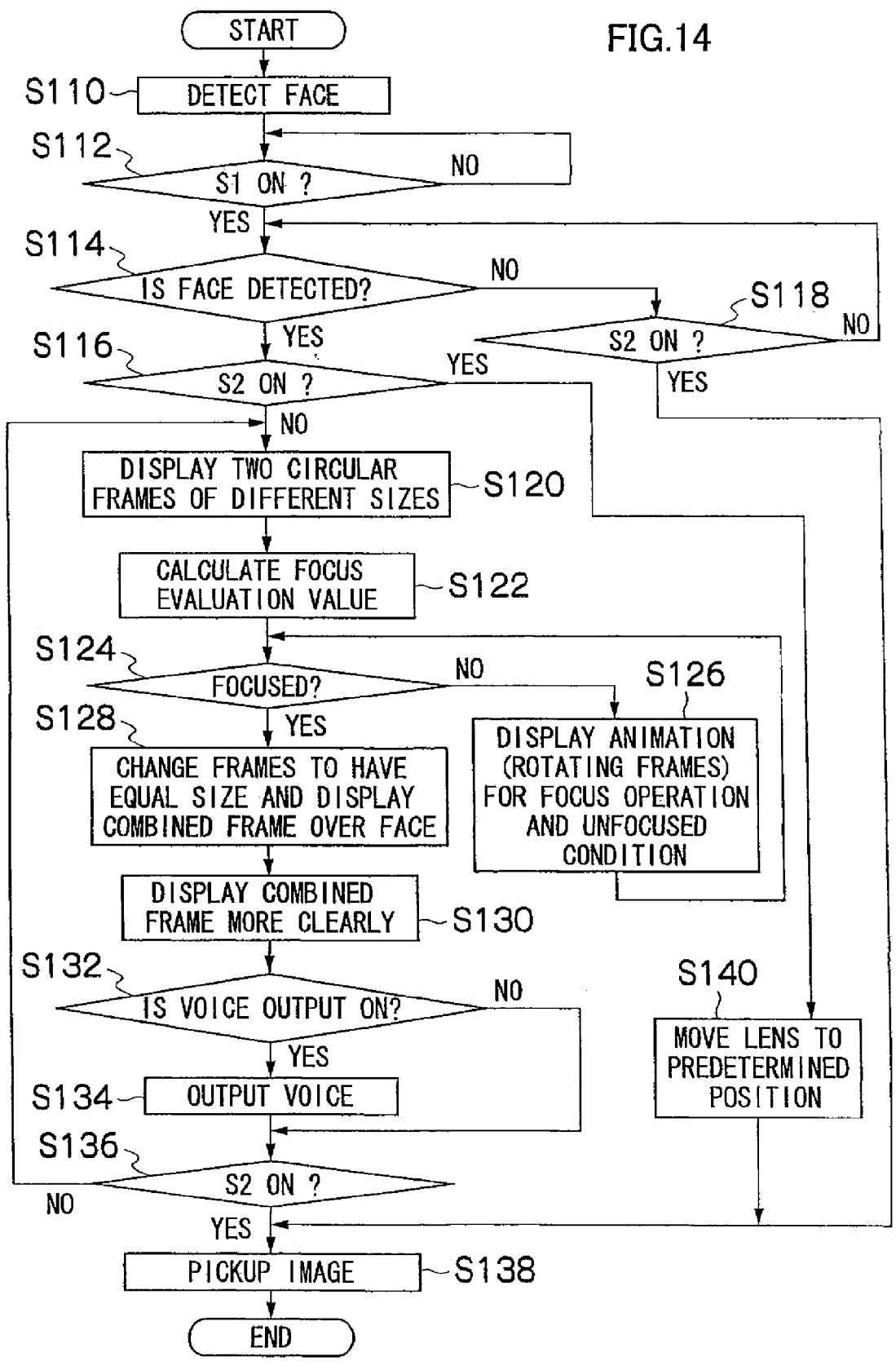
FIG. 14 is a flowchart showing a first embodiment of processes for an animated image display of the digital camera.

FIG. 14 is a flowchart showing a flow of processes for a focus condition display of the digital camera 11. The following steps are generally executed by the CPU 110.

In a stand-by state for an image pickup where a through-the-lens image is displayed on the monitor 32, the face detecting section 154 detects a face of an object from an input object image, and when the image includes a face, an extraction of a face area and a detection of a face position are performed (Step S110).

It is determined whether a half-press of the shutter button 26 (S1ON) is detected or not (Step S112). When S1ON is not detected (Step S112=NO), Step S112 is repeated.

When S1ON is detected (Step S112=YES), it is determined whether a face has been detected from the object image at Step S110 (Step S114). When a face is detected (Step S114=YES), it is determined whether S2ON is detected or not (Step S116).

When a face is not detected (Step S114=NO), it is determined whether S2ON is detected or not (Step S118). When S2ON is not detected (Step S118=NO), the step of detecting a face (Step S114) is repeated, and when S2ON is detected (Step S118=YES), an image is picked up (Step S138).

When S2ON is detected (Step S116=YES), an AF cannot be accurately performed, thereby a group of focusing lenses is moved to a predetermined position (Step S140) for an image pickup (Step S138).

Figure 15A:
FIG. 15A is a display example of a first embodiment of an animated image of the digital camera before a focusing operation is completed.

When S2ON is not detected (Step S116=NO), as shown in FIG. 15A, two circular frames having different sizes from each other are concentrically displayed in different colors at any position (e.g., the center) on a through-the-lens image (Step S120). In this case, the outer circular frame has a larger area than the face area detected at Step S114. When the two circular frames have the same area, each circular frame is configured with a plurality of arcs so that the overlap of the two circular frames forms one circle.

The lens driving section 146 is controlled to move the group of focusing lenses while focus evaluation values at a plurality of AF detection points are calculated, so that the lens position having the local maximum evaluation value is determined to be a focus position (Step S122). Then, so as to move the group of focusing lenses to the obtained focus position, the lens driving section 146 is controlled to start the movement of the group of focusing lenses.

It is determined whether the detected face is focused or not at Step S114 (Step S124). When it is determined that the face is not focused yet (Step S124=NO), the group of focusing lenses are moved to the obtained focus point, and at the same time, the animated image generating section 164 generates an animated image in which an inner circular frame and an outer circular frame rotate in different directions from each other, which are overlapped and displayed over the through-the-lens image (Step S126). That is, the animated image generating section 164 generates an animated image in which the size of the outer circular frame is reduced and the size of the inner circular frame is increased in response to a focusing condition so that the outer circular frame rotates at a desired speed clockwise and the inner circular frame rotates at a desired speed counterclockwise and also the two arcs has an equal size to each other when an image is focused. The generation of an animated image in which circular frames rotate in different directions increases the visibility of the rotation of circular frames. The CPU 110 composites and displays the generated animated image into the through-the-lens image so that the animated image moves from the position displayed at Step S120 to the face detected at Step S114. Then, Step S124 is repeated again.

Figure 15B:
FIG. 15B is a display example of the first embodiment of an animated image of the digital camera when a focusing operation is completed.

When the desired area is focused, that is, the movement of the group of focusing lenses is completed (Step S124=YES), as shown in FIG. 15B, the circle formed by the two circular frames which have an equal size to each other and are overlapped to each other is overlapped over the face detected at Step S114 (Step S128). Then, the two circular frames are clearly displayed with a higher lightness (Step S130).

It is determined whether the voice output is turned on (Step S132). When the voice output is turned on (Step S132=YES), a sound such as voice, melody, call and the like which indicates that the focusing is completed is output via the speaker 36 (Step S134), and then it is determined whether S2ON is detected or not (Step S136). When the voice output is not turned on (Step S132=NO), it is determined whether S2ON is detected or not (Step S136).

When S2ON is not detected (Step S136=NO), the process returns to the step of displaying two circular frames having different sizes from each other (Step S120). When S2ON is detected (Step S136=YES), an image is picked up (Step S130).

According to the present embodiment, a plurality of rotating frames are displayed when an image is not focused, and the frames form one stationary circle when an image is focused, which enables a focusing condition and a focused condition to be informed in a manner easily understood by a user. When an AF has not been accurately performed, no frame is displayed, which guides the user to perform an AF operation. Also, when the face is detected, the frames are overlapped and displayed over the detected face, which shows the user the focused area in a manner easily understood. And a voice in addition to the display is output, which indicates the user that the area is focused in a manner more easily understood by a user.

In the present embodiment, the displayed frame has a circular shape, but without limitation to the circle, the frame may have various shapes including any geometric configuration (such as a triangle, a rectangular, and an oval) and irregular shapes such as a heart shape. This allows a user to be informed of a focusing condition by a display which attracts a user's attention. The shape such as a triangle, a rectangular, an oval, and a heart shape which change its shape when rotated has an advantage that the stationary state of the shape is more recognizable than the case of a circular shape.

Also, in the present embodiment, the two circular frames are displayed in different colors from each other, but the two circular frames may be displayed in the intermediate color between the two different colors when an image is focused. For example, when the outer frame is displayed in blue and the inner frame is displayed in yellow, the circle formed by the two frames when an image is focused is a yellow green color. In this way, a plurality of frames can be displayed in changed colors, which increases the visibility thereof. The color change between the rotating frame and the stationary frame makes the face more recognizable that the frame stopped. Of course, the two frames may be displayed in the same color.

Also, in the present embodiment, the visibility is increased by displaying a frame more clearly when focused, but without limitation, any display may be used that allows a user to be informed of a focused condition. For example, the frame may have a darker color, or the frame may have a broader line when focused.

Also, in the present embodiment, the frame is rotated at a predetermined rotation speed, but the rotation speed may be changed in response to a focusing condition. The frames may be rotated at a speed which is calculated using the approximate time which is required from the calculation of the focus position to a focusing, or rotated at a speed which is obtained by calculating the time required for the movement of the group of focusing lenses from the focus position, and calculating a rotation speed which allows the rotation to end simultaneously with the timing when the predetermined area is focused.

Also, in the present embodiment, the plurality of frames are rotated in different directions from each other to enable a focused condition to be more clearly informed to a user, but the frames may be rotated in the same direction. In this case, the complexity can be reduced to decrease the number of processings.

Second Embodiment of Focus Condition Display

Figure 16:
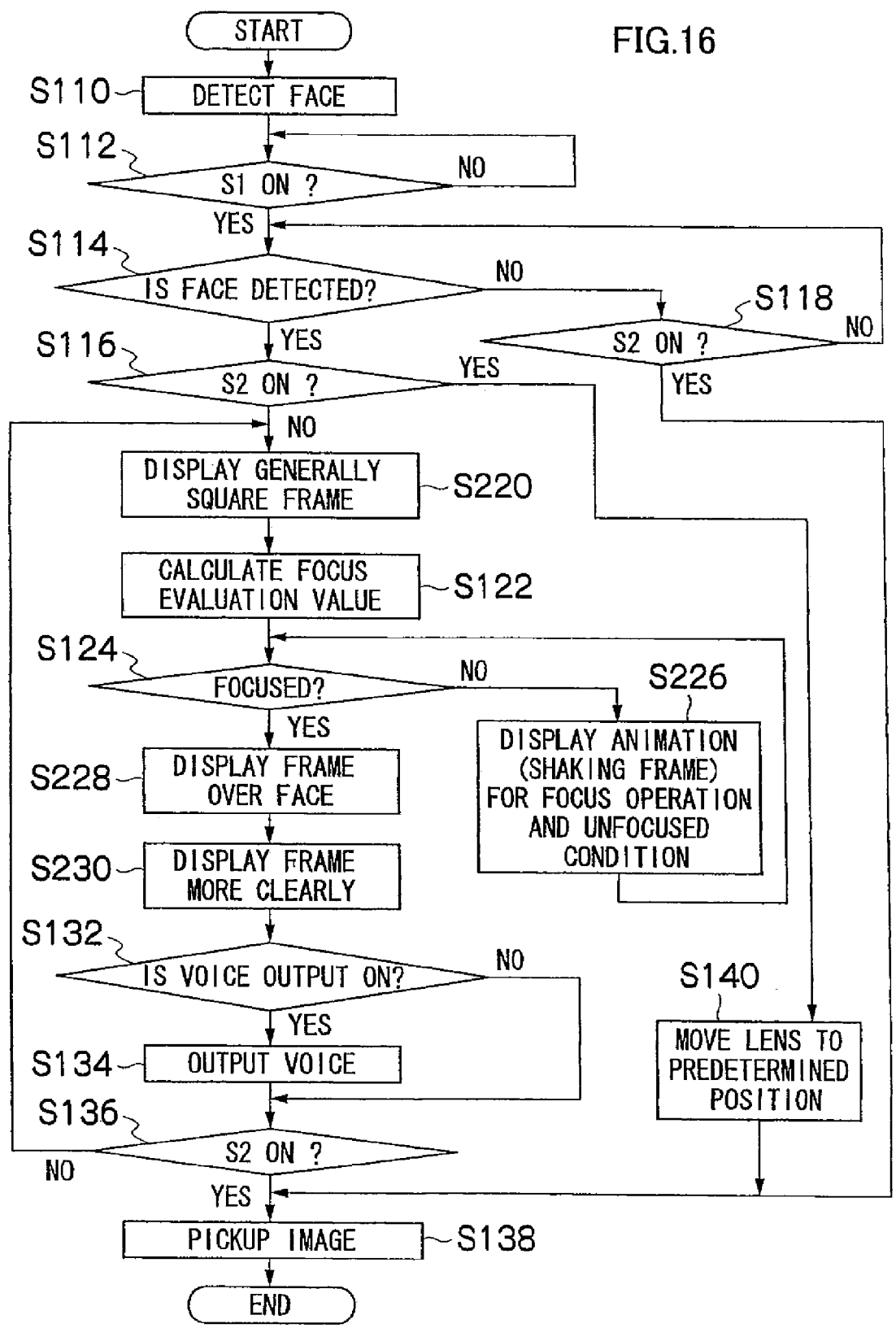
FIG. 16 is a flowchart showing a second embodiment of processes for an animated image display of the digital camera.

In a second embodiment of a focus condition display, an animation in which a rectangular frame is shaking is displayed. FIG. 16 is a flowchart showing a flow of processes for a focus condition display of the digital camera 11. The following steps are generally executed by the CPU 110. The same parts as those in the first embodiment are denoted by the same reference numerals and will not be described in detail here.

It is determined whether S1ON is detected or not (Step S112). When S1ON is not detected (Step S112=NO), Step S112 is repeated.

When S1ON is detected (Step S112=YES), it is determined whether a face has been detected from the object image at Step S110 (Step S114). When a face is detected (Step S114=YES), it is determined whether S2ON is detected or not (Step S116).

When a face is not detected (Step S114=NO), it is determined whether S2ON is detected or not (Step S118). When S2ON is not detected (Step S118=NO), the step of detecting a face (Step S114) is repeated, and when S2ON is detected (Step S118=YES), an image is picked up (Step S138).

When S2ON is detected (Step S116=YES), an AF cannot be accurately performed, thereby a group of focusing lenses is moved to predetermined position (Step S140) for an image pickup (Step S138).

Figure 17A:
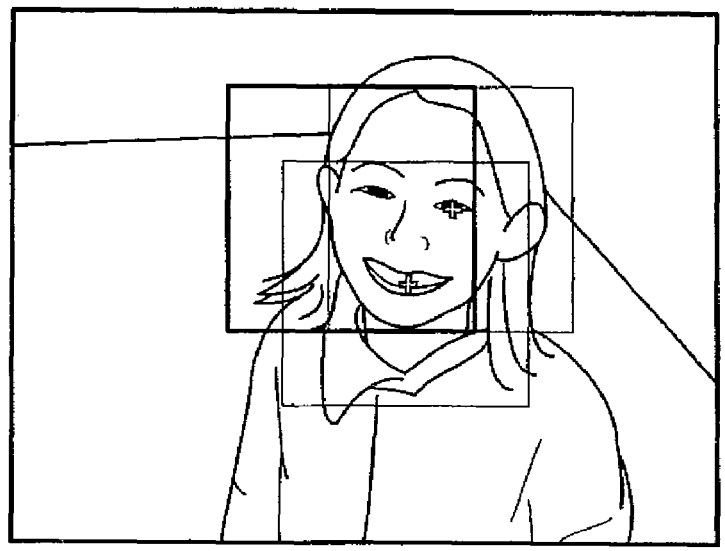
FIG. 17A is a display example of a second embodiment of an animated image of the digital camera before a focusing operation is completed.

When S2ON is not detected (Step S116=NO), as shown in FIG. 17A, a generally square frame is displayed at any position (e.g., the center) on a through-the-lens image (Step S220). Now, an example with one generally square frame will be explained below, but as shown in FIG. 17A, one or more secondary frames (frame having narrower lines) which move in tandem with the main frame (frame having a broader line) may be displayed. In addition, a mark which indicates eyes, mouth, or the like may be displayed on the detected face.

The lens driving section 146 is controlled to move the group of focusing lenses while focus evaluation values at a plurality of AF detection points are calculated, so that the lens position having the local maximum evaluation value is determined to be a focus position (Step S122). Then, so as to move the group of focusing lenses to the obtained focus position, the lens driving section 146 is controlled to start the movement of the group of focusing lenses.

It is determined whether the detected face is focused or not at Step S114 (Step S124). When it is determined that the face is not focused yet (Step S124=NO), the group of focusing lenses is moved to the obtained focus point, and at the same time, an animated image in which a generally square frame is constantly moving, that is the frame is shaking, is generated to be overlapped and displayed on the through-the-lens image by the animated image generating section 164 (Step S226). That is, the animated image generating section 164 generates an animated image in which a generally square frame continues to move at a predetermined speed and about a certain area by a distance in response to a focusing condition in a random direction. The CPU 110 composites and displays the generated animated image into the through-the-lens image so that the area which is the center of the movement is overlapped over the face detected at Step S114. Then, Step S124 is repeated again.

Figure 17B:
FIG. 17B is a display example of the second embodiment of an animated image of the digital camera when a focusing operation is completed.

When the desired area is focused, that is, the movement of the group of focusing lenses is completed (Step S124=YES), as shown in FIG. 17B, the generally square frame is overlapped over the face detected at Step S114 (Step S228). Then, the generally square frame is clearly displayed with a higher lightness (Step S230).

It is determined whether the voice output is turned on (Step S132). When the voice output is turned on (Step S132=YES), a sound such as voice, melody, call and the like which indicates that the focusing is completed is output via the speaker 36 (Step S134), and then it is determined whether S2ON is detected or not (Step S136). When the voice output is not turned on (Step S132=NO), it is determined whether S2ON is detected or not (Step S136).

When S2ON is not detected (Step S136=NO), the process returns to the step of displaying a generally square frame (Step S220). When S2ON is detected (Step S136=YES), an image is picked up (Step S138).

According to the present embodiment, the moving frame is stopped, which enables a focused condition to be informed in a manner easily understood by a user. When an AF has not been accurately performed, no frame is displayed, which guides the user to perform an AF operation. Also, when the face is detected, the frame stops moving at a position on the detected face, which shows the user the focused area in a manner easy to understand. And a voice in addition to the display is output, which indicates the user that the area is focused in a manner more easily understood by a user.

In the present embodiment, the displayed frame has a generally square shape, but without limitation to this, the frame may have various shapes including any geometric configuration such as a triangle, a rectangular, a polygonal, a circular, and an oval, and irregular shapes such as a heart shape.

Also, in the present embodiment, the visibility is increased by displaying a frame more clearly when focused, but without limitation, any display may be used that allows a user to be informed of a focused condition. For example, the frame may have a darker color, or the frame may have a broader line when focused.

Also, in the present embodiment, the frame is moved at a predetermined speed, but the moving speed may be changed in response to a moving distance.

Third Embodiment of Focus Condition Display

In a third embodiment of a focus condition display, an animation in which ears of an animal (for example, a rabbit) move in response to a focusing condition is displayed. FIG. 18 is a flowchart showing a flow of processes for a focus condition display of the digital camera 11. The following steps are generally executed by the CPU 110. The same parts as those in the first embodiment are denoted by the same reference numerals and will not be described in detail here.

It is determined whether S1ON is detected or not (Step S112). When S1ON is not detected (Step S112=NO), Step S112 is repeated.

When S1ON is detected (Step S112=YES), it is determined whether a face has been detected from the object image at Step S110 (Step S114). When a face is detected (Step S114=YES), it is determined whether S2ON is detected or not (Step S116).

When a face is not detected (Step S114=NO), it is determined whether S2ON is detected or not (Step S118). When S2ON is not detected (Step S118=NO), the step of detecting a face (Step S114) is repeated, and when S2ON is detected (Step S118=YES), an image is picked up (Step S138).

When S2ON is detected (Step S116=YES), an AF cannot be accurately performed, thereby a group of focusing lenses is moved to a predetermined position (Step S140) for an image pickup (Step S138).

Figure 19A:
FIG. 19A is a display example of a third embodiment of an animated image of the digital camera before a focusing operation is completed.

When S2ON is not detected (Step S116=NO), as shown in FIG. 19A, bended (flopped) ears of a rabbit are displayed on the top of the face detected at Step S114 (Step S320).

The lens driving section 146 is controlled to move the group of focusing lenses while focus evaluation values at a plurality of AF detection points are calculated, so that the lens position having the local maximum evaluation value is determined to be a focus position (Step S122). Then, so as to move the group of focusing lenses to the obtained focus position, the lens driving section 146 is controlled to start the movement of the group of focusing lenses.

It is determined whether the detected face is focused or not at Step S114 (Step S124). When it is determined that the face is not focused yet (Step S124=NO), the group of focusing lenses is moved to the obtained focus point, and at the same time, an animated image in which the flopped ears of the rabbit begin to stick up in swinging in the lateral direction in response to a focusing condition, and the ears of the rabbit stick up when focused is generated by the animated image generating section 164, to be overlapped and displayed at the same position as that of the flopped ears of the rabbit at Step S320 on the through-the-lens image by the CPU 110 (Step S326). Then, Step S124 is repeated again.

Figure 19B:
FIG. 19B is a display example of the third embodiment of an animated image of the digital camera when a focusing operation is completed.

When the desired area is focused, that is, the movement of the group of focusing lenses is completed (Step S124=YES), as shown in FIG. 19B, the stuck and stationary ears of the rabbit are displayed at the same position as that of the flopped ears of the rabbit at Step S320 (Step S328). Then, the stuck ears of the rabbit are clearly displayed with a higher lightness (Step S330).

It is determined whether the voice output is turned on (Step S132). When the voice output is turned on (Step S132=YES), a sound such as voice, melody, call and the like which indicates that the focusing is completed is output via the speaker 36 (Step S134), and then it is determined whether S2ON is detected or not (Step S136). When the voice output is not turned on (Step S132=NO), it is determined whether S2ON is detected or not (Step S136).

When S2ON is not detected (Step S136=NO), the process returns to the step of displaying flopped ears of a rabbit (Step S320). When S2ON is detected (Step S136=YES), an image is picked up (Step S138).

According to the present embodiment, the display form of a rabbit ears which attract a user's attention is used, which shows to a user that a focusing operation is performed. The sticking level of the rabbit ears visibly shows the progress level of a focusing operation, which enables a focusing condition and a focused condition to be informed in a manner easily understood by a user. Also, when an AF has not been accurately performed, no rabbit ears are displayed, which guides the user to perform an AF operation. Also, rabbit ears are displayed on a detected face, which shows the user the area to be focused or the focused area in a manner easy to understand.

In the present embodiment, an example with rabbit ears was explained above, but without limitation to the rabbit ears, any ears of an animal which usually stick up such as dog ears, elephant ears, giant panda ears, and the like may be used.

Also, in the present embodiment, the visibility is increased by displaying rabbit ears more clearly when focused, but without limitation, any display may be used that allows a user to be informed easily of a focused condition. For example, the entire rabbit ears may have a darker color, or the rabbit ears may have a broader line when focused.

Fourth Embodiment of Focus Condition Display

Figure 20:
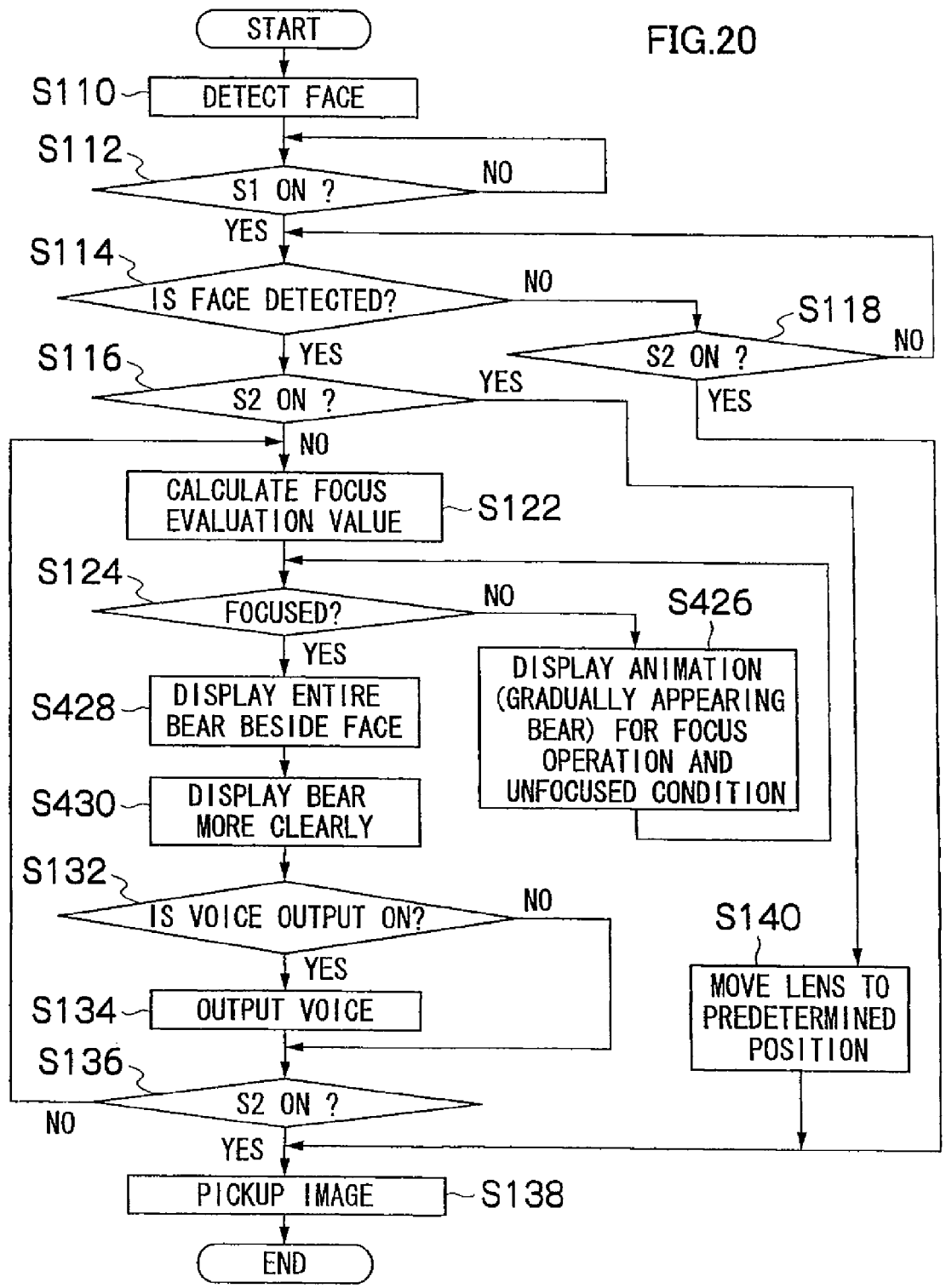
FIG. 20 is a flowchart showing a fourth embodiment of processes for an animated image display of the digital camera.

In a fourth embodiment of a focus condition display, an animation in which a picture of character such as an animal (for example, a bear) appears little by little in response to a focusing condition is displayed. FIG. 20 is a flowchart showing a flow of processes for a focus condition display of the digital camera 11. The following steps are generally executed by the CPU 110. The same parts as those in the first embodiment are denoted by the same reference numerals and will not be described in detail here.

It is determined whether S1ON is detected or not (Step S112). When S1ON is not detected (Step S112=NO), Step S112 is repeated.

When S1ON is detected (Step S112=YES), it is determined whether a face has been detected from the object image at Step S110 (Step S114). When a face is detected (Step S114=YES), it is determined whether S2ON is detected or not (Step S116).

When a face is not detected (Step S114=NO), it is determined whether S2ON is detected or not (Step S118). When S2ON is not detected (Step S118=NO), the step of detecting a face (Step S114) is repeated, and when S2ON is detected (Step S118=YES), an image is picked up (Step S138).

When S2ON is detected (Step S116=YES), an AF cannot be accurately performed, thereby a group of focusing lenses is moved to a predetermined position (Step S140) for an image pickup (Step S138).

When S2ON is not detected (Step S116=NO), the lens driving section 146 is controlled to move the group of focusing lenses while focus evaluation values at a plurality of AF detection points are calculated, so that the lens position having the local maximum evaluation value is determined to be a focus position (Step S122). Then so as to move the group of focusing lenses to the obtained focus position, the lens driving section 146 is controlled to start the movement of the group of focusing lenses.

Figure 21A:
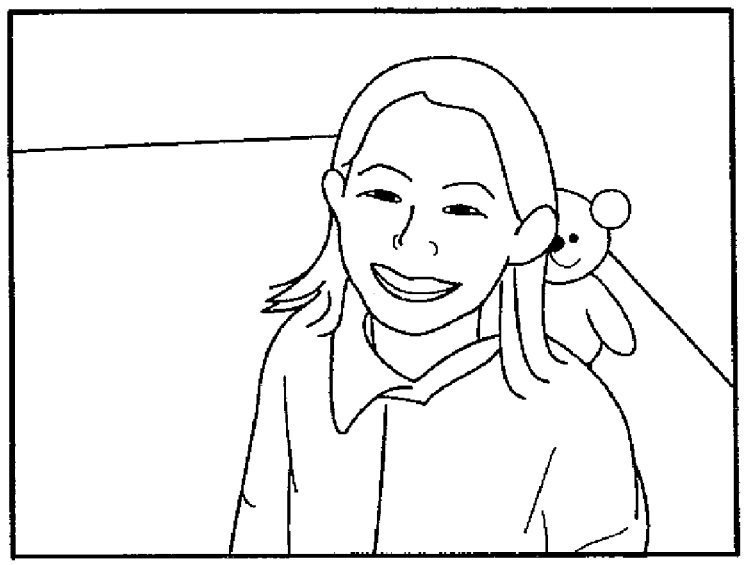
FIG. 21A is a display example of a fourth embodiment of an animated image of the digital camera before a focusing operation is completed.
Figure 21B:
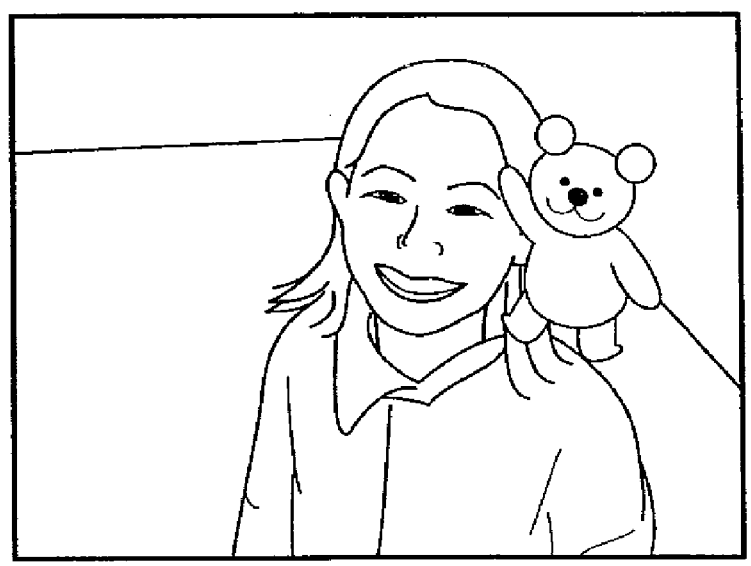
FIG. 21B is a display example of the fourth embodiment of an animated image of the digital camera when a focusing operation is completed.

It is determined whether the detected face is focused or not at Step S114 (Step S124). When it is determined that the face is not focused yet (Step S124=NO), the group of focusing lenses is moved to the obtained focus point, and at the same time, an animated image in which a bear character appears little by little as the focusing operation progresses is generated by the animated image generating section 164, to be overlapped and displayed over the through-the-lens image (Step S426). That is, the animated image generating section 164, as shown in FIG. 21A, generates an animated image in which a bear character appears from a location near the face, for example, a side of the face little by little as the focusing operation progresses, and as shown in FIG. 21B, the entire bear character is displayed beside the face when focused. The CPU 110 composites and displays the generated animated image into the through-the-lens image so that the bear character appears from a side of the face detected at Step S114. Then, Step S124 is repeated again.

When the desired area is focused, that is, the movement of the group of focusing lenses is completed (Step S124=YES), as shown in FIG. 21B, the entire bear character is displayed to be located beside the face detected at Step S114, and also a part of the bear character is overlapped over the front surface of the face (Step S428). Then, the bear character is clearly displayed with a higher lightness (Step S430).

It is determined whether the voice output is turned on (Step S132). When the voice output is turned on (Step S132=YES), a sound such as voice, melody, call and the like which indicates that the focusing is completed is output via the speaker 36 (Step S134), and then it is determined whether S2ON is detected or not (Step S136). When the voice output is not turned on (Step S132=NO), it is determined whether S2ON is detected or not (Step S136).

When S2ON is not detected (Step S136=NO), the process returns to the step of calculating focus evaluation values (Step S122). When S2ON is detected (Step S136=YES), an image is picked up (Step S138).

According to the present embodiment, the display form of a bear character which attracts a user's attention is used, which shows to a user that a focusing operation is performed. The appearance amount of the bear character visibly shows the progress level of a focusing operation, which enables a focusing condition and a focused condition to be informed in a manner easily understood by a user. Also, when an AF has not been accurately performed, no bear character is displayed, which guides the user to perform an AF operation. Also, a bear character is displayed near a detected face, which shows the user the area to be focused or the focused area in a manner easily understood.

Also, in the present embodiment, the visibility is increased by displaying a bear character more clearly when focused, but without limitation, any display may be used that allows a user to be informed easily of a focused condition. For example, the bear character may have a darker color, or the bear character may have a broader line when focused.

Fifth Embodiment of Focus Condition Display

In a fifth embodiment of a focus condition display, an animation in which an animal (for example, a bird) moves in response to a focusing condition is displayed. FIG. 22 is a flowchart showing a flow of processes for a focus condition display of the digital camera 11. The following steps are generally executed by the CPU 110. The same parts as those in the first embodiment are denoted by the same reference numerals and will not be described in detail here.

It is determined whether S1ON is detected or not (Step S112). When S1ON is not detected (Step S112=NO), Step S112 is repeated.

When S1ON is detected (Step S112=YES), it is determined whether a face has been detected from the object image at Step S110 (Step S114). When a face is detected (Step S114=YES), it is determined whether S2ON is detected or not (Step S116).

When a face is not detected (Step S114=NO), it is determined whether S2ON is detected or not (Step S118). When S2ON is not detected (Step S118=NO), the step of detecting a face (Step S114) is repeated, and when S2ON is detected (Step S118=YES), an image is picked up (Step S138).

When S2ON is detected (Step S116=YES), an AF cannot be accurately performed, thereby a group of focusing lenses is moved to a predetermined position (Step S140) for an image pickup (Step S138).

Figure 23A:
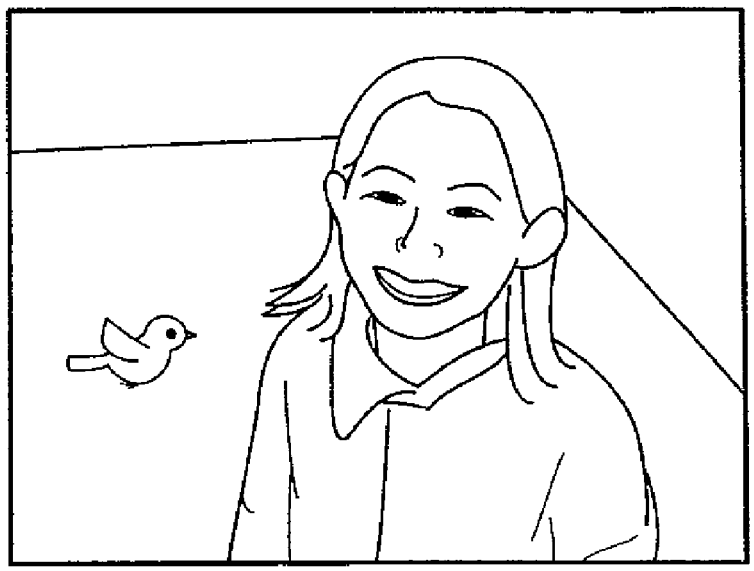
FIG. 23A is a display example of a fifth embodiment of an animated image of the digital camera before a focusing operation is completed.

When S2ON is not detected (Step S116=NO), as shown in FIG. 23A, a flying bird is displayed at a predetermined location (for example, a lower left portion of a screen) (Step S520).

The lens driving section 146 is controlled to move the group of focusing lenses while focus evaluation values at a plurality of AF detection points are calculated, so that the lens position having the local maximum evaluation value is determined to be a focus position (Step S122). Then, so as to move the group of focusing lenses to the obtained focus position, the lens driving section 146 is controlled to start the movement of the group of focusing lenses.

It is determined whether the detected face is focused or not at Step S114 (Step S124). When it is determined that the face is not focused yet (Step S124=NO), the group of focusing lenses is moved to the obtained focus point, and at the same time, an animated image in which a bird is flying here and there in the screen is generated by the animated image generating section 164, to be overlapped and displayed over the through-the-lens image by the CPU 110 (Step S526). Then, Step S124 is repeated again.

Figure 23B:
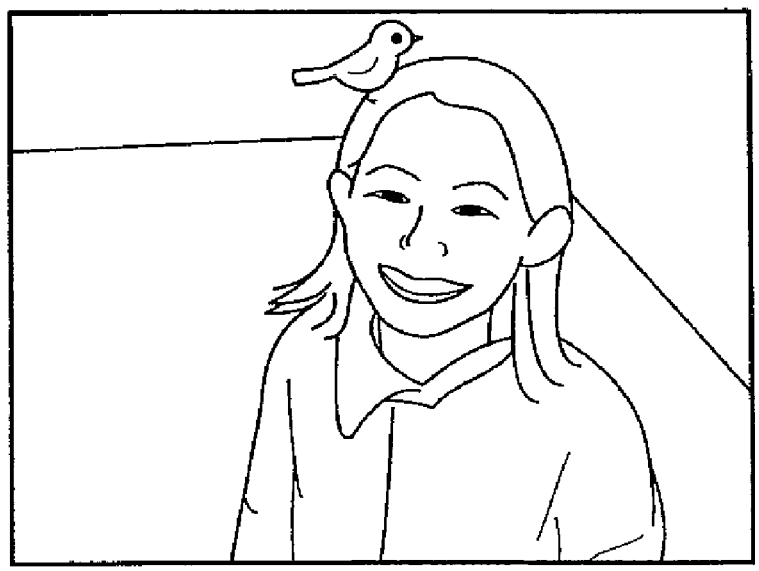
FIG. 23B is a display example of the fifth embodiment of an animated image of the digital camera when a focusing operation is completed.

When the desired area is focused, that is, the movement of the group of focusing lenses is completed (Step S124=YES), as shown in FIG. 23B, the bird rests on the top of the face detected at Step S114 (Step S528). Then, the resting bird is clearly displayed with a higher lightness (Step S530).

It is determined whether the voice output is turned on (Step S132). When the voice output is turned on (Step S132=YES), a sound such as voice, melody, call and the like which indicates that the focusing is completed is output via the speaker 36 (Step S134), and then it is determined whether S2ON is detected or not (Step S136). When the voice output is not turned on (Step S132=NO), it is determined whether S2ON is detected or not (Step S136).

When S2ON is not detected (Step S136=NO), the process returns to the step of displaying a flying bird at a predetermined location (Step S520). When S2ON is detected (Step S136=YES), an image is picked up (Step S138).

According to the present embodiment, the display form of a flying bird which attracts a user's attention is used, which shows to a user that a focusing operation is performed. The action to rest of the flying bird visibly shows that a focusing is completed in a manner easily understood by a user. Also, when an AF has not been accurately performed, no bird is displayed, which guides the user to perform an AF operation. Also, a bird rests on a detected face, which shows the user the focused position in a manner easily understood.

Also, in the present embodiment, an example with a bird was explained above, but, any ears of an animal which naturally flies such as butterfly, dragonfly, bee, bat, and the like may be used. In the case of an animated image using a butterfly, an animated image may be generated in which a butterfly flying here and there in the screen at Step S526, so that at Step S528, the butterfly stops flying and rests on a face detected at Step S114, and at Step S530, the resting butterfly is clearly displayed with a higher lightness.

Also, in the present embodiment, the visibility is increased by displaying a bird which stops flying and rests when focused, but without limitation, any display may be used that allows a user to be informed easily of a focused condition. For example, the bird may have a darker color, or the bird may have a broader line when focused.

Sixth Embodiment of Focus Condition Display

Figure 24:
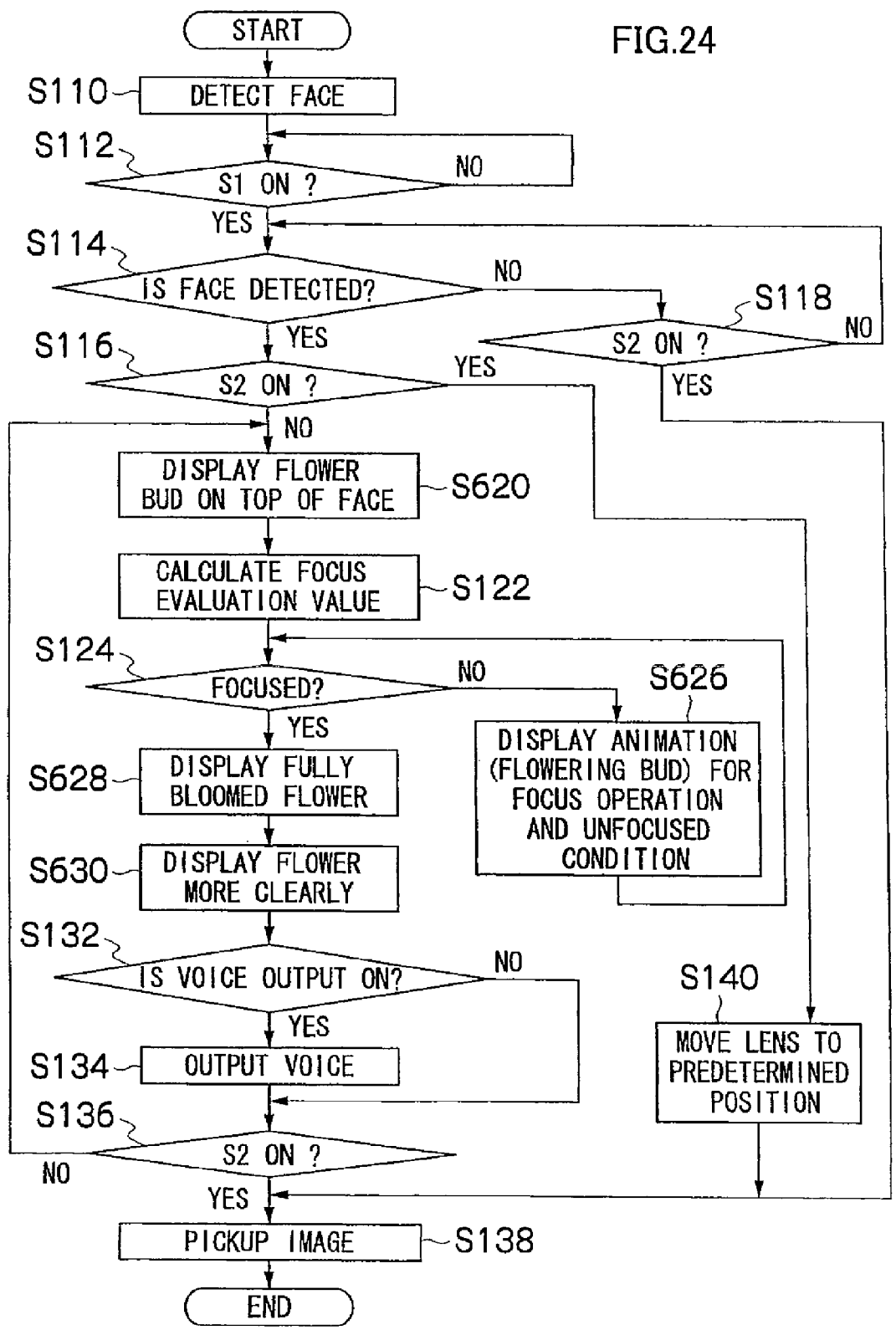
FIG. 24 is a flowchart showing a sixth embodiment of processes for an animated image display of the digital camera.

In a sixth embodiment of a focus condition display, an animation in which a flower blooms in response to a focusing condition is displayed. FIG. 24 is a flowchart showing a flow of processes for a focus condition display of the digital camera 11. The following steps are generally executed by the CPU 110. The same parts as those in the first embodiment are denoted by the same reference numerals and will not be described in detail here.

It is determined whether S1ON is detected or not (Step S112). When S1ON is not detected (Step S112=NO), Step S112 is repeated.

When S1ON is detected (Step S112=YES), it is determined whether a face has been detected from the object image at Step S110 (Step S114). When a face is detected (Step S114=YES), it is determined whether S2ON is detected or not (Step S116).

When a face is not detected (Step S114=NO), it is determined whether S2ON is detected or not (Step S118). When S2ON is not detected (Step S118=NO), the step of detecting a face (Step S114) is repeated, and when S2ON is detected (Step S118=YES), an image is picked up (Step S138).

When S2ON is detected (Step S116=YES), an AF cannot be accurately performed, thereby a group of focusing lenses is moved to a predetermined position (Step S140) for an image pickup (Step S138).

Figure 25A:
FIG. 25A is a display example of a sixth embodiment of an animated image of the digital camera before a focusing operation is completed.

When S2ON is not detected (Step S116=NO), as shown in FIG. 25A, a flower bud is displayed on the face detected at Step S114 (Step S620).

The lens driving section 146 is controlled to move the group of focusing lenses while focus evaluation values at a plurality of AF detection points are calculated, so that the lens position having the local maximum evaluation value is determined to be a focus position (Step S122). Then, so as to move the group of focusing lenses to the obtained focus position, the lens driving section 146 is controlled to start the movement of the group of focusing lenses.

It is determined whether the detected face is focused or not at Step S114 (Step S124). When it is determined that the face is not focused yet (Step S124=NO), the group of focusing lenses is moved to the obtained focus point, and at the same time, an animated image in which a flower blooms gradually in response to a focusing condition is generated by the animated image generating section 164, to be composited and displayed at the same position as that of the flower bud at Step S620 on the through-the-lens image by the CPU 110 (Step S626). Then, Step S124 is repeated again.

Figure 25B:
FIG. 25B is a display example of the sixth embodiment of an animated image of the digital camera when a focusing operation is completed.

When the desired area is focused, that is, the movement of the group of focusing lenses is completed (Step S124=YES), as shown in FIG. 25B, the fully bloomed flower is displayed at the same position as that of the flower bud at Step S620 (Step S628). Then, the fully bloomed flower is clearly displayed with a higher lightness (Step S630).

It is determined whether the voice output is turned on (Step S132). When the voice output is turned on (Step S132=YES), a sound such as voice, melody, call and the like which indicates that the focusing is completed is output via the speaker 36 (Step S134), and then it is determined whether S2ON is detected or not (Step S136). When the voice output is not turned on (Step S132=NO), it is determined whether S2ON is detected or not (Step S136).

When S2ON is not detected (Step S136=NO), the process returns to the step of displaying a flower bud (Step S620). When S2ON is detected (Step S136=YES), an image is picked up (Step S138).

According to the present embodiment, the display form of a flower which attracts a user's attention is used, which shows to a user that a focusing operation is performed. The blooming of the flower visibly shows the progress level of a focusing operation, which enables a focusing condition and a focused condition to be informed in a manner easily understood by a user. Also, when an AF has not been accurately performed, no flower is displayed, which guides the user to perform an AF operation. Also, a flower is displayed near a detected face, which shows the user the position to be focused or the focused position in a manner easily understood.

Also, in the present embodiment, the visibility is increased by displaying a fully bloomed flower more clearly when focused, but without limitation, any display may be used that allows a user to be informed easily of a focused condition. For example, the flower may have a darker color, or the flower may have a broader line when focused.

Seventh Embodiment of Focus Condition Display

Figure 26:
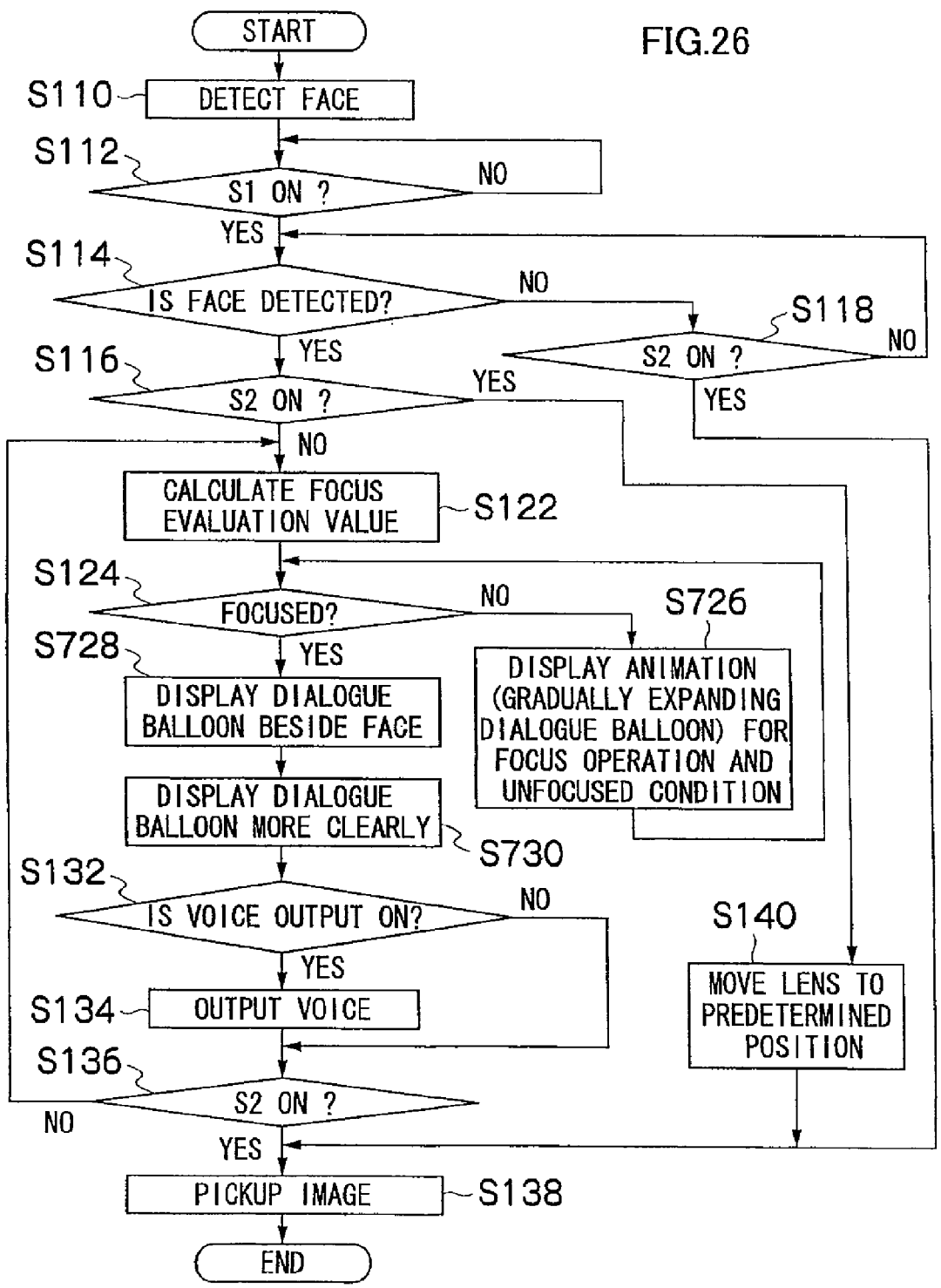
FIG. 26 is a flowchart showing a seventh embodiment of processes for an animated image display of the digital camera.

In a seventh embodiment of a focus condition display, an animation in which a dialogue balloon is expanded in response to a focusing condition is displayed. FIG. 26 is a flowchart showing a flow of processes for a focus condition display of the digital camera 11. The following steps are generally executed by the CPU 110. The same parts as those in the first embodiment are denoted by the same reference numerals and will not be described in detail here.

It is determined whether S1ON is detected or not (Step S112). When S1ON is not detected (Step S112=NO), Step S112 is repeated.

When S1ON is detected (Step S112=YES), it is determined whether a face has been detected from the object image at Step S110 (Step S114). When a face is detected (Step S114=YES), it is determined whether S2ON is detected or not (Step S116).

When a face is not detected (Step S114=NO), it is determined whether S2ON is detected or not (Step S118). When S2ON is not detected (Step S118=NO), the step of detecting a face (Step S114) is repeated, and when S2ON is detected (Step S118=YES), an image is picked up (Step S138).

When S2ON is detected (Step S116=YES), an AF cannot be accurately performed, thereby a group of focusing lenses is moved to a predetermined position (Step S140) for an image pickup (Step S138).

When S2ON is not detected (Step S116=NO), the lens driving section 146 is controlled to move the group of focusing lenses while focus evaluation values at a plurality of AF detection points are calculated, so that the lens position having the local maximum evaluation value is determined to be a focus position (Step S122). Then, so as to move the group of focusing lenses to the obtained focus position, the lens driving section 146 is controlled to start the movement of the group of focusing lenses.

Figure 27A:
FIGS. 27A to 27C are display examples of a seventh embodiment of an animated image of the digital camera.
Figure 27B:
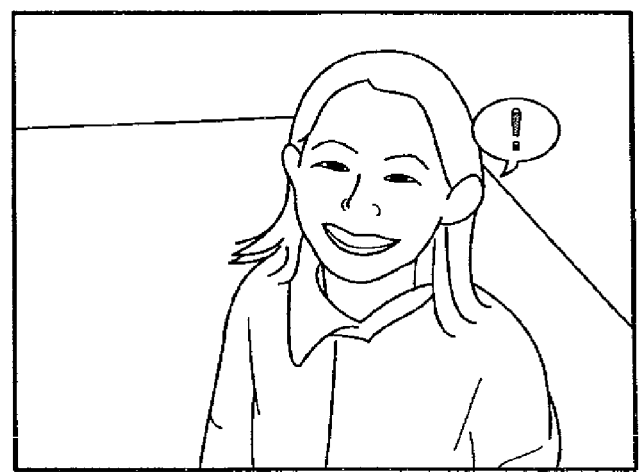
Figure 27C:
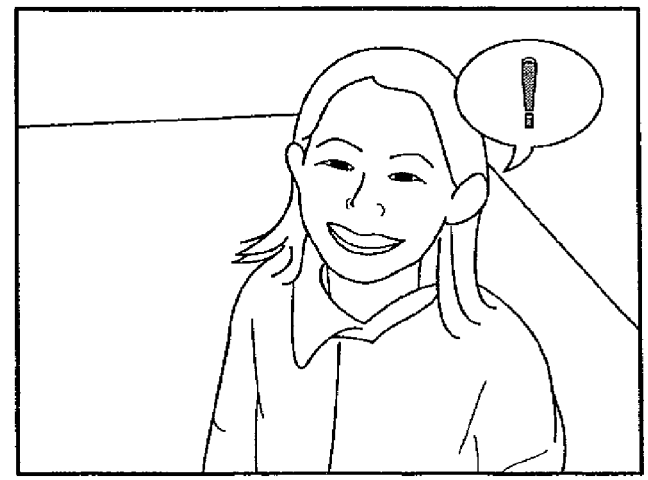
Figure 28:
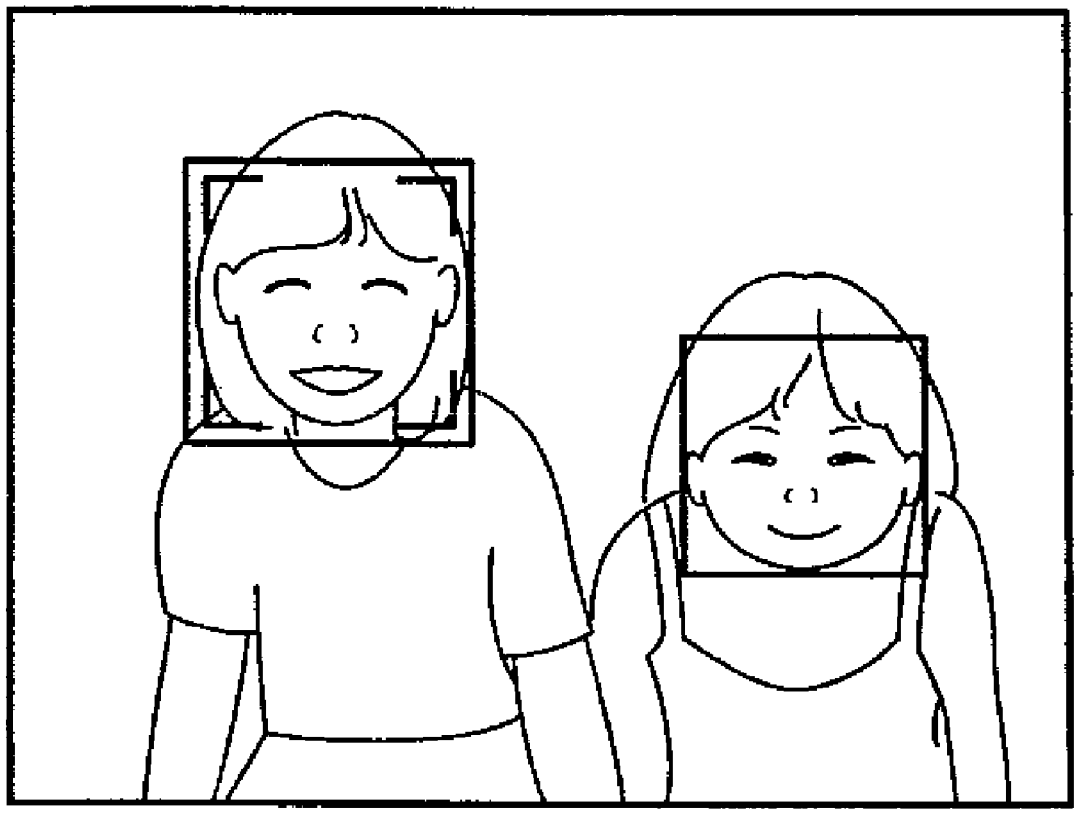
FIG. 28 is a display example of the related art.

It is determined whether the detected face is focused or not at Step S114 (Step S124). When it is determined that the face is not focused yet (Step S124=NO), the group of focusing lenses are moved to the obtained focus point, and at the same time, an animated image in which a dialogue balloon is expanded in response to a focusing condition is generated by the animated image generating section 164, to be overlapped and displayed on the through-the-lens image (Step S726). That is, the animated image generating section 164, as shown in FIG. 27A, generates an animated image in which a dialogue balloon (or a small circle) of an extremely small size is displayed right after a focusing operation is started, and as shown in FIG. 27B, the size of the dialogue balloon is gradually increased as the focusing operation progresses, so that as shown in FIG. 27C, the dialogue balloon has the maximum size when the focusing operation is completed. The CPU 110 displays the generated animated image near the face detected at Step S114 (for example, on one side thereof). Then, Step S124 is repeated again. The position where the dialogue balloon is displayed is not limited to near the face, and the face detecting section 154 may detect a mouth so that the dialogue balloon is displayed as if it comes out from the detected mouth.

When the desired area is focused, that is, the movement of the group of focusing lenses is completed (Step S124=YES), as shown in FIG. 27C, the dialogue balloon of the maximum size is displayed near the face detected at Step S114 (Step S728). Then, the dialogue balloon is clearly displayed with a higher lightness (Step S730).

It is determined whether the voice output is turned on (Step S132). When the voice output is turned on (Step S132=YES), a sound such as voice, melody, call and the like which indicates that the focusing is completed is output via the speaker 36 (Step S134), and then it is determined whether S2ON is detected or not (Step S136). When the voice output is not turned on (Step S132=NO), it is determined whether S2ON is detected or not (Step S136).

When S2ON is not detected (Step S136=NO), the process returns to the step of calculating focus evaluation values (Step S122). When S2ON is detected (Step S136=YES), an image is picked up (Step S138).

According to the present embodiment, a dialogue balloon which attracts a user's attention by changing its size is used, which shows to a user that a focusing operation is performed. The size of the dialogue balloon visibly shows the progress level of a focusing operation, which enables a focusing condition and a focused condition to be informed in a manner easily understood by a user. Also, when an AF has not been accurately performed, no dialogue balloon is displayed, which guides the user to perform an AF operation. Also, a dialogue balloon is displayed near a detected face, which shows the user the focused position in a manner easily understood.

In the present embodiment, the visibility is increased by displaying a dialogue balloon more clearly when focused, but without limitation, any display may be used that allows a user to be informed easily of a focused condition. For example, the dialogue balloon may have a broader line when focused.

Also, in the present embodiment, an animated image in which a dialogue balloon having a letter "!" therein has a variable size is composited in a through-the-lens image, but an animated image in which the dialogue balloon has a letter "?" therein until a focusing operation is completed, and has the letter "!" therein when the focusing operation is completed may be generated to be composited in a through-the-lens image. This enables a focused condition to be clearly informed to a user.

In the present invention, a face is detected to be focused, but the target for detection is not limited to a face, and an entire person, an animal such as dog, cat, and rabbit, a car, and the like may be detected to be focused. Various known techniques may be used to detect an entire person, an animal, a car, and the like.

The application of the present invention is not limited to a digital camera, but the present invention may be applied to an image pickup apparatus such as a mobile phone with camera and a video camera as well.

What is claimed is:

1. An image pickup apparatus, comprising:
an image pickup device which picks up an image of an object;
an image capturing device which continuously captures an image signal representing the object via the image pickup device;
a displaying device which displays a through-the-lens image based on the captured image signal;
an automatic focus adjusting device which performs automatic focus adjustment to maximize a contrast of the object based on the captured image signal;
a focusing condition detecting device which detects a focusing condition of the object after the adjustment by the automatic focus adjusting device; and a display control device which composites a display area for displaying focusing information into the through-the-lens image of the displaying device, and also compositing focusing information which is different at least between when an image is not focused and when an image is focused into the display area in response to the focusing condition detected by the focusing condition detecting device;

a face detection device which detects the object's face from the captured image signal, wherein the automatic focus adjusting device performs automatic focus adjustment on the detected face when the face is detected by the face detection device, the display control device composites a display area displayed on a through-the-lens image on the displaying device into a location near the face detected by the face detection device and the display area displayed on the through-the-lens image on the displaying device by the display control device has a dialogue balloon shape.

2. The image pickup apparatus according to claim 1, further comprising a storing device which stores focusing information corresponding to a focusing condition which includes at least information of an unfocused condition and information of a focused condition, wherein the display control device composites the focusing information stored in the storing device into the display area.

3. The image pickup apparatus according to claim 2, further comprising an input device which inputs focusing information in response to a focusing condition, wherein the storing device stores the focusing information input by the input device, and when a plurality of pieces of focusing information corresponding to an identical focusing condition are stored in the storing device, the display control device selects a desired piece of the focusing information from the plurality of pieces of the focusing information, and composites the piece into the display area.

4. The image pickup apparatus according to claim 2, wherein the display control device switches the focusing information from the information of an unfocused condition to the information of a focused condition upon a detection of a focus adjustment by the focusing condition detecting device.

5. The image pickup apparatus according to claim 1, wherein the face detection device detects an object's face and expression, and the display control device composites focusing information based on the expression detected by the face detection device into the display area.

6. The image pickup apparatus according to claim 1, wherein the display control device changes the size of the display area in response to the detected result by the focusing condition detecting device.

7. An image pickup apparatus, comprising:

an image pickup device which picks up an image of an object;

an image capturing device which continuously captures an image signal representing the object via the image pickup device;

a displaying device which displays a through-the-lens image based on the captured image signal;

an automatic focus adjusting device which performs automatic focus adjustment to a desired area of the object based on the captured image signal;

a focusing condition detecting device which detects a focusing condition of the object after the adjustment by the automatic focus adjusting device;

an animated image generating device which generates an animated image related to a frame corresponding to a desired area of the object having at least one of the features: variable position; variable size; and variable shape, and displays a different image at least between when an image is not focused and when an image is focused; and a display control device which composites the animated image into the through-the-lens image in response to the focusing condition detected by the focusing condition detecting device, wherein the animated image generating device generates an animated image having a plurality of frames which are concentrically displayed, with the plurality of frames having different sizes and rotating until the focusing condition detecting device detects a focused condition, and the plurality of frames having an equal size to each other and stopping when the focusing condition detecting device detects a focused condition.

8. The image pickup apparatus according to claim 7, wherein the animated image generating device generates an animated image having the plurality of frames which rotate in different directions from each other until the focusing condition detecting device detects a focused condition.

9. The image pickup apparatus according to claim 7, wherein the animated image generating device generates an animated image having the frames which continue to rotate in predetermined directions at predetermined angular velocities until the focusing condition detecting device detects a focused condition.

10. The image pickup apparatus according to claim 7, wherein the display control device changes a distance between the frame and the area to which the focus adjustment has been performed in response to the focusing condition detected by the focusing condition detecting device, and when the focusing condition detecting device detects a focused condition, causes the frame to be overlapped and displayed over the area to which the focus adjustment has been performed.

11. An image pickup apparatus, comprising:

an image pickup device which picks up an image of an object;

an image capturing device which continuously captures an image signal representing the object via the image pickup device;

a displaying device which displays a through-the-lens image based on the captured image signal;

an automatic focus adjusting device which performs automatic focus adjustment to a desired area of the object based on the captured image signal;

a focusing condition detecting device which detects a focusing condition of the object after the adjustment by the automatic focus adjusting device;

an animated image generating device which generates an animated image related to a frame corresponding to a desired area of the object having at least one of the features: variable position; variable size; and variable shape, and displays a different image at least between when an image is not focused and when an image is focused; and a display control device which composites the animated image into the through-the-lens image in response to the focusing condition detected by the focusing condition detecting device, wherein the animated image generating device generates an animated image having a frame which shakes near the desired area until a focused condition is detected by the focusing condition detecting device.

12. An image pickup apparatus, comprising:

an image pickup device which picks up an image of an object;

an image capturing device which continuously captures an image signal representing the object via the image pickup device;

a displaying device which displays a through-the-lens image based on the captured image signal;

an automatic focus adjusting device which performs automatic focus adjustment to a desired area of the object based on the captured image signal;

a focusing condition detecting device which detects a focusing condition of the object after the adjustment by the automatic focus adjusting device;

an animated image generating device which generates an animated image having at least one of the features: variable position; variable size; and variable shape, and displays a different image at least between when an image is not focused and when an image is focused; and a display control device which composites the animated image into the through-the-lens image in response to the focusing condition detected by the focusing condition detecting device, wherein the animated image generating device generates an animated image which displays a different flower stage in response to the focusing condition detected by the focusing condition detecting device, so that a flower bud is displayed when the desired area of the object is not focused and a bloomed flower is displayed when the desired area of the object is focused, and the display control device causes the animated image to be displayed at a location near the area to which an automatic focus adjustment has been performed.

13. An image pickup apparatus, comprising:

an image pickup device which picks up an image of an object;

an image capturing device which continuously captures an image signal representing the object via the image pickup device;

a displaying device which displays a through-the-lens image based on the captured image signal;

an automatic focus adjusting device which performs automatic focus adjustment to a desired area of the object based on the captured image signal;

a focusing condition detecting device which detects a focusing condition of the object after the adjustment by the automatic focus adjusting device;

an animated image generating device which generates an animated image having at least one of the features: variable position; variable size; and variable shape, and displays a different image at least between when an image is not focused and when an image is focused; and a display control device which composites the animated image into the through-the-lens image in response to the focusing condition detected by the focusing condition detecting device, wherein the animated image generating device generates an animated image of a dialogue balloon which has a different size in response to the focusing condition detected by the focusing condition detecting device, and the display control device causes the animated image to be displayed at a location near the area to which an automatic focus adjustment has been performed by the automatic focus adjusting device.

14. The image pickup apparatus according to claim 13, wherein the animated image generating device generates an animated image of a dialogue balloon which has a different image therein at least between when the desired area of the object is focused and when the desired area of the object is not focused.

15. An image pickup apparatus, comprising:

an image pickup device which picks up an image of an object;

an image capturing device which continuously captures an image signal representing the object via the image pickup device;

a displaying device which displays a through-the-lens image based on the captured image signal;

an automatic focus adjusting device which performs automatic focus adjustment to a desired area of the object based on the captured image signal;

a focusing condition detecting device which detects a focusing condition of the object after the adjustment by the automatic focus adjusting device;

an animated image generating device which generates an animated image indicating an animal or a part of an animal having at least one of the features: variable position; variable size; and variable shape, and displays a different image at least between when an image is not focused and when an image is focused; and a display control device which composites the animated image into the through-the-lens image in response to the focusing condition detected by the focusing condition detecting device.

16. The image pickup apparatus according to claim 15, wherein the animated image generating device generates an animated image of ears of an animal which change the posture thereof in response to the focusing condition detected by the focusing condition detecting device, and the ears slope down when an image is not focused and the ears stick up when an image is focused, and the display control device causes the animated image to be overlapped and displayed over the area to which the focus adjustment has been performed.

17. The image pickup apparatus according to claim 16, wherein when the automatic focus adjusting device performs a focus adjustment to an object's face, the display control device causes the animated image to be overlapped and displayed over the object's face.

18. The image pickup apparatus according to claim 15, wherein the animated image generating device generates an animated image which displays a different part of an animal in response to the focusing condition detected by the focusing condition detecting device so that an animation of only a part of the animal is displayed when the desired area of the object is not focused and the entire animal is displayed when the desired area of the object is focused, and the display control device causes the animated image to be overlapped and displayed over the area to which an automatic focus adjustment has been performed.

19. The image pickup apparatus according to claim 15, wherein the animated image generating device generates an animated image which displays a different status of an animal that naturally flies in response to the focusing condition detected by the focusing condition detecting device so that the flying animal is displayed when the desired area of the object is not focused, and displays the animal resting when the desired area of the object is focused, and the display control device causes the animated image of the flying animal to be located near the area to which an automatic focus adjustment has been performed when the focusing condition detecting device detects a focused condition.

* * * * *